US008812859B2

(12) United States Patent
Yeap et al.

(10) Patent No.: US 8,812,859 B2
(45) Date of Patent: Aug. 19, 2014

(54) METHOD, SYSTEM AND APPARATUS FOR ACCESSING A RESOURCE BASED ON DATA SUPPLIED BY A LOCAL USER

(75) Inventors: Tet Hin Yeap, Ottawa (CA); William G. O'Brien, Nanaimo (CA)

(73) Assignee: BCE Inc., Verdun, Quebec (CA)

( * ) Notice: Subject to any disclaimer, the term of this patent is extended or adjusted under 35 U.S.C. 154(b) by 1339 days.

(21) Appl. No.: 12/173,872

(22) Filed: Jul. 16, 2008

(65) Prior Publication Data

US 2009/0024853 A1 Jan. 22, 2009

(30) Foreign Application Priority Data

Jul. 16, 2007 (CA) .................................... 2593897

(51) Int. Cl.
| | |
|---|---|
| *G06F 7/04* | (2006.01) |
| *G06F 11/30* | (2006.01) |
| *G06F 12/00* | (2006.01) |
| *H04N 7/16* | (2011.01) |
| *H04L 9/08* | (2006.01) |
| *H04L 29/06* | (2006.01) |

(52) U.S. Cl.
CPC .............. *H04L 9/0822* (2013.01); *H04L 9/083* (2013.01); *H04L 63/0428* (2013.01)
USPC ................... 713/182; 726/2; 726/18; 726/19; 726/26; 726/27

(58) Field of Classification Search
CPC .... H04L 9/0822; H04L 9/083; H04L 36/0428
USPC .......... 713/182, 185, 186; 726/2–5, 9, 20, 21; 380/247, 251, 255, 259, 264, 270, 277, 380/278, 280, 44
See application file for complete search history.

(56) References Cited

U.S. PATENT DOCUMENTS

| | | | | |
|---|---|---|---|---|
| 5,604,801 | A | * 2/1997 | Dolan et al. | 713/159 |
| 5,983,208 | A | * 11/1999 | Haller et al. | 705/40 |
| 6,189,105 | B1 | 2/2001 | Lopes | |
| 6,453,416 | B1 * | 9/2002 | Epstein | 713/170 |
| 6,959,384 | B1 * | 10/2005 | Serret-Avila | 713/176 |
| 6,978,021 | B1 * | 12/2005 | Chojnacki | 380/202 |
| 6,988,198 | B1 * | 1/2006 | Zuccherato et al. | 713/170 |
| 7,172,115 | B2 * | 2/2007 | Lauden | 235/380 |

(Continued)

OTHER PUBLICATIONS

RFC 2898, PKCS #5: Password-Based Cryptography Specification Version 2.0, 2000, Retrieved from the Internet <URL: ietf.org/rfc/rfc2898.txt.pdf>, pp. 1-34 as printed.*

*Primary Examiner* — Saleh Najjar
*Assistant Examiner* — Feliciano Mejia

(57) ABSTRACT

A method, comprising: acquiring candidate data in association with a request for accessing a resource, the candidate data comprising first data and second data; processing the first data with a first key in an attempt to effect decryption of the first data, thereby to obtain first processed data; processing the second data with a second key in an attempt to effect decryption of the second data, thereby to obtain second processed data; and granting the request if a pre-determined portion of the first processed data is derivable from the second processed data. The method may further comprise extracting from the first processed data a group identifier and the pre-determined portion of the first processed data, and effecting a comparison of the group identifier to a reference group identifier in order to conclude whether the first data has been successfully decrypted based on an outcome of the comparison.

82 Claims, 19 Drawing Sheets

(56) References Cited

U.S. PATENT DOCUMENTS

| | | | |
|---|---|---|---|
| 7,805,372 B2* | 9/2010 | Weiss | 705/51 |
| 7,900,052 B2* | 3/2011 | Jonas | 713/179 |
| 7,925,055 B2* | 4/2011 | Kevenaar et al. | 382/115 |
| 8,166,308 B2* | 4/2012 | Smith et al. | 713/180 |
| 2003/0046589 A1* | 3/2003 | Gregg | 713/201 |
| 2003/0091192 A1* | 5/2003 | Chen et al. | 380/277 |
| 2003/0140235 A1* | 7/2003 | Immega et al. | 713/186 |
| 2003/0217280 A1* | 11/2003 | Keaton et al. | 713/193 |
| 2004/0015697 A1* | 1/2004 | de Queiroz | 713/176 |
| 2004/0250095 A1* | 12/2004 | Feldman | 713/191 |
| 2005/0114217 A1* | 5/2005 | Monk | 705/17 |
| 2005/0234778 A1* | 10/2005 | Sperduti et al. | 705/22 |
| 2005/0235148 A1* | 10/2005 | Scheidt et al. | 713/168 |
| 2005/0269402 A1* | 12/2005 | Spitzer et al. | 235/380 |
| 2006/0123463 A1 | 6/2006 | Yeap et al. | |
| 2006/0131412 A1* | 6/2006 | O'Brien et al. | 235/451 |
| 2006/0150211 A1* | 7/2006 | Ritter | 725/31 |
| 2006/0173848 A1* | 8/2006 | Peterson et al. | 707/9 |
| 2008/0069347 A1* | 3/2008 | Brown et al. | 380/45 |
| 2008/0229119 A1* | 9/2008 | Skoric et al. | 713/193 |
| 2010/0134246 A1* | 6/2010 | Kevenaar et al. | 340/5.82 |

* cited by examiner

| | 620 | 630 | 640* |
|---|---|---|---|
| 610a | B(G) | $D_{Pu}(G)$ | I(G) |
| 610b | B(G1) | $D_{Pu}(G1)$ | I(G1) |
| 610c | B(G2) | $D_{Pu}(G2)$ | I(G2) |
| 610d | B(G3) | $D_{Pu}(G3)$ | I(G3) |
| 610e | B(G4) | $D_{Pu}(G4)$ | I(G4) |
| 610f | B(Gz) | $D_{Pu}(Gz)$ | I(Gz) |

Record 130

FIG. 6

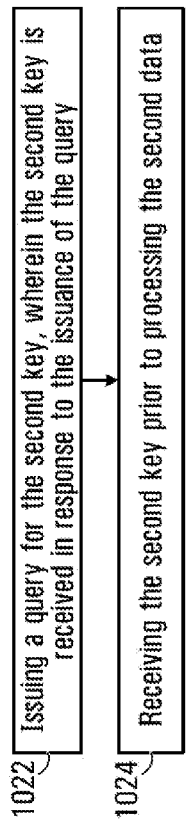

FIG. 7F

1022 Issuing a query for the second key, wherein the second key is received in response to the issuance of the query 1024 Receiving the second key prior to processing the second data

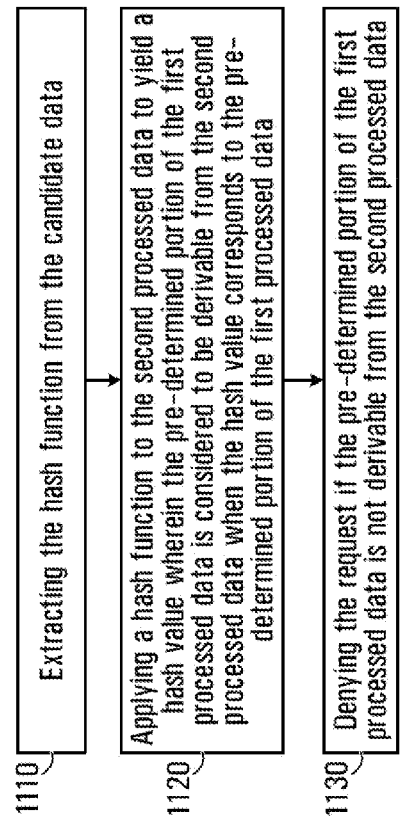

FIG. 7G

1110 Extracting the hash function from the candidate data

1120 Applying a hash function to the second processed data to yield a hash value wherein the pre-determined portion of the first processed data is considered to be derivable from the second processed data when the hash value corresponds to the pre-determined portion of the first processed data 1130 Denying the request if the pre-determined portion of the first processed data is not derivable from the second processed data

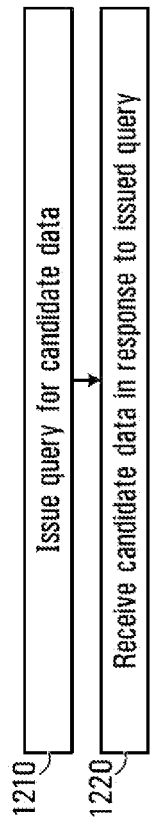

FIG. 7H

1210 Issue query for candidate data

1220 Receive candidate data in response to issued query

METHOD, SYSTEM AND APPARATUS FOR ACCESSING A RESOURCE BASED ON DATA SUPPLIED BY A LOCAL USER

FIELD OF THE INVENTION

The present invention relates generally to accessing a resource, and specifically to accessing a resource based on data supplied by a local user.

BACKGROUND OF THE INVENTION

Increasingly, organizations establish trust relationships to allow each others' customers to access resources belonging to each organization, independent of which organization owns the resource. In these circumstances, a user associated with a home entity will be allowed to access the resources of a visited entity when the user is roaming. For example, a first bank may allow customers of a second bank to access ATMs belonging to the first bank. In another example, debit cards from a bank may be used at point of sale terminals of department stores, restaurants, gas stations etc. In yet another example, customers of a first internet provider may allow customers of a second internet provider to gain access to their network via access equipment owned by the first internet provider, for example wireless access points or access terminals, in cafes, airports, etc. In yet another example, groups of employees of a second organization who are working within a first organization may be authorized for access to certain resources within the first organization including network access and physical access (e.g. doors, buildings etc.).

These and other situations share some common characteristics. First, there are a limited number of organizations which allow each others' customers access to resources owned by each organization. Second, there is a pre-established trust relationship between the limited number of organizations, with each organization acting as a trusted entity to the other organizations within that trust relationship. Third, there is a pre-established trust relationship between each organization and its members.

Currently, the trust relationship between a limited number of trusted entities is reflected by a first trusted entity (the visited entity) that operates a resource, allowing a trusted user from a second trusted entity (the user's home entity) access to the resource, when the user is roaming from his or her home entity. Further, the first trusted entity allows the resource to communicate with the second trusted entity to verify credentials of the trusted user. A result of this verification is transmitted back to the resource of the first trusted entity, which then allows the user access, for example to make transactions. In this instance, and in particular if the transaction is a financial transaction, further communications may need to occur between the resources of the first trusted entity and the second trusted entity to complete the transaction. In addition, this trust relationship may be reflected in the billing relationship between the two entities: for example, the first trusted entity trusts the second trusted entity to accurately bill for the trusted user's access to the resource, and the first trusted entity trusts the second trusted entity to transmit the first trusted entity's share of this payment.

The initial access process generally has two parts. First, it must be determined which trusted identity the user is associated with, so that credentials and data can be transmitted to the trusted entity. Second, the credentials of the user must be verified as the credentials of a trusted user authorized to access the resource, and in some instances exchange information with their trusted entity. Hence, the credentials generally include an indication of the user's trusted entity (e.g. their bank, their access provider, their company, etc.), and a personal identifier, such as a user ID. In this context, several problems arise, related to both volume and security. For example, the indication of the user's trusted entity is generally provided to the resource in the clear (i.e. not encrypted) via a swipe card, a wireless tag or a data entry event, which may allow a malicious user to acquire this data unbeknownst to the user and further compile a list of these indications. These indications may be used in attacks on the network through which trusted entities communicate. Further, the remote verification and authorization of the user can create excess traffic on a network.

Against this background, it is clear that there is a need for improved access control techniques in interactions with a resource based on data supplied by a local user.

SUMMARY OF THE INVENTION

A first broad aspect of the invention seeks to provide a method, comprising: acquiring candidate data in association with a request for accessing a resource, said candidate data comprising first data and second data; processing said first data with a first key in an attempt to effect decryption of said first data, thereby to obtain first processed data; processing the second data with a second key in an attempt to effect decryption of said second data, thereby to obtain second processed data; and granting said request if a pre-determined portion of said first processed data is derivable from said second processed data.

A second broad aspect of the invention seeks to provide a computer-readable medium comprising computer-readable program code which, when interpreted by a computing apparatus, causes the computing apparatus to execute a method. The computer-readable program code comprises first computer-readable program code for causing the computing apparatus to acquire candidate data in association with a request for accessing a resource, said candidate data comprising first and second data; second computer-readable program code for causing the computing apparatus to process said first data with a first key in an attempt to effect decryption of said first data, thereby to obtain first processed data; third computer-readable program code for causing the computing apparatus to process the second data with a second key in an attempt to effect decryption of said second data, thereby to obtain second processed data; and fourth computer-readable program code for causing the computing apparatus to grant said request if a pre-determined portion of said first processed data is derivable from said second processed data.

A third broad aspect of the invention seeks to provide a method, comprising: receiving a request for accessing a resource, said request comprising first data and second data; processing said first data with a key in an attempt to effect decryption of said first data, thereby to obtain processed data; and granting said request if a pre-determined portion of said processed data is derivable from said second data.

A fourth broad aspect of the invention seeks to provide a method of pre-authorizing a user to access a resource, comprising: determining a user identifier associated with the user; applying a hash function to said user identifier to create a hash value; determining a second identifier associated with a group of users pre-authorized to access the resource, said group including said user; encrypting the second identifier and at least one of the user identifier and the hash value with an encryption key to produce first data; and providing said first data and the other of the user identifier and the hash value to said user.

A fifth broad aspect of the invention seeks to provide a tag, comprising: a memory storing an encrypted version of first data and an encrypted version of second data, said first data capable of being retrieved by decryption using a first key received from a first entity, said second data capable of being retrieved by decryption using a second key received from a user of the tag, wherein a pre-determined portion of said first data is derivable from said second data when the user is pre-authorized by the first entity to access a resource associated with a second entity having a trust relationship with the first entity.

A sixth broad aspect of the invention seeks to provide a method, comprising; informing a user of a data element indicative of said user being pre-authorized to access a resource to which access is controlled by a gateway entity; receiving usage data from said gateway entity, said usage data being indicative of said user accessing said resource via said gateway entity; and compensating said gateway entity for said user's access to said resource.

BRIEF DESCRIPTION OF THE DRAWINGS

Embodiments of the present invention are described below, by way of example only, with reference to the following drawings, in which:

FIG. 6 depicts a record, according to a non-limiting embodiment of the present invention;

FIG. 7f depicts a method for receiving a second key;

FIG. 7g depicts a method for accessing a resource based on data supplied by a local user by using a hash function;

FIG. 7h depicts a method for acquiring candidate data

It is to be expressly understood that the description and drawings are only for the purpose of illustration of exemplary embodiments of the invention and are an aid for understanding. They are not intended to be a definition of the limits of the invention.

DETAILED DESCRIPTION OF NON-LIMITING EMBODIMENTS

Figure 1:
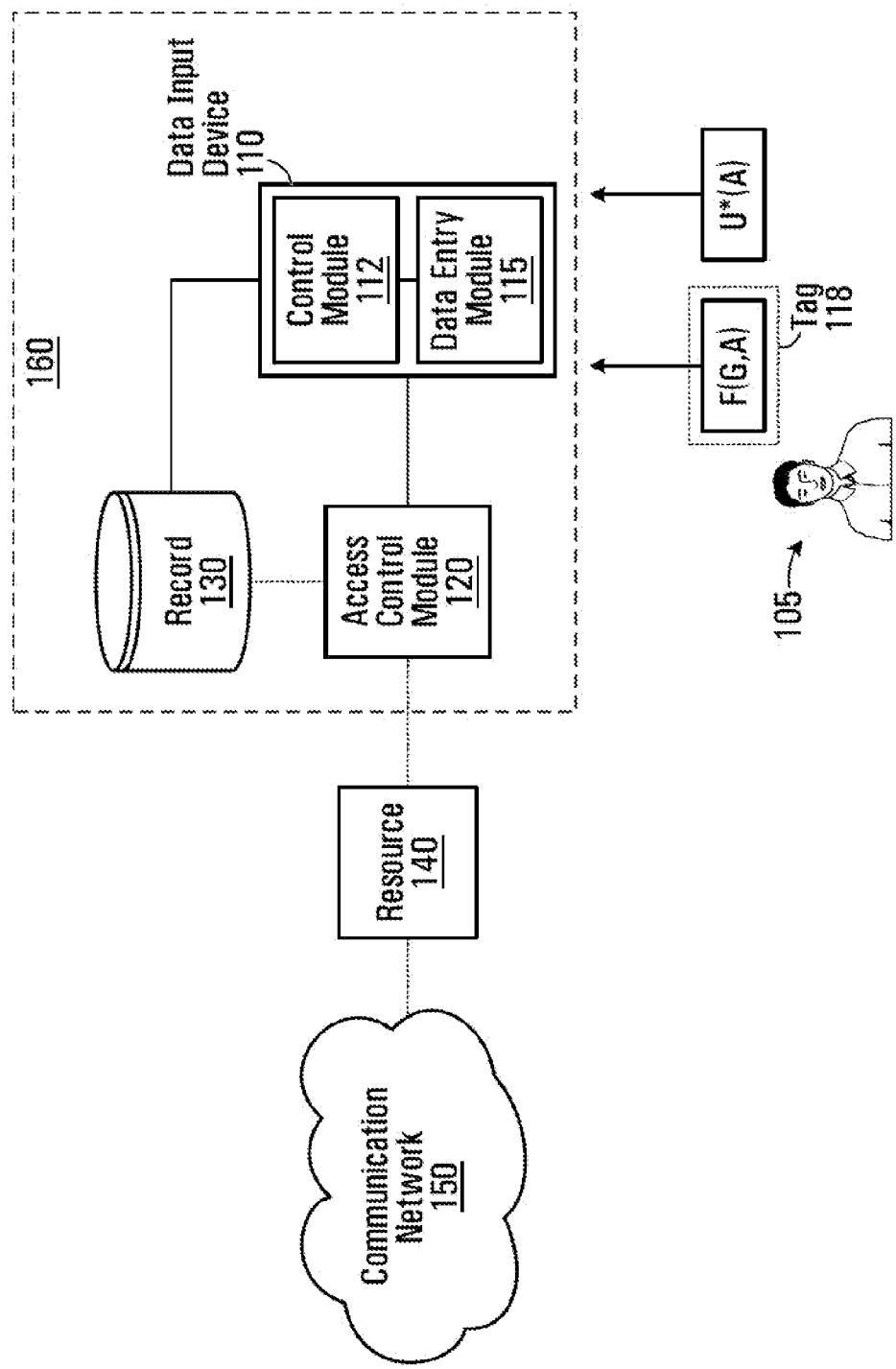
FIG. 1 depicts an architecture for providing access to a resource based on data supplied by a local user, according to a non-limiting embodiment of the present invention.

FIG. 1 depicts a system for accessing a resource 140 based on data supplied by a local user 105. The system comprises a data input device 110 in communication with an access control module 120 and having access to a record 130. The access control module 120 is a device which permits access to, or usage of, the resource 140. In some embodiments, the resource 140 may be in communication with a communication network 150. For example, the resource 140 may be, or be a part of, an automated teller machine (ATM), a computer, a terminal for accessing the communication network 150, a point of sale terminal, a physical access point (e.g., a door), and so on. It will be appreciated that the resource 140 may be any other resource of interest in other embodiments.

The resource 140 is associated with a first entity, which can be referred to as a gateway entity. For example, the resource 140 may be owned, operated and/or controlled by the gateway entity. In some embodiments, the first entity may be a company, a specific business unit or subsidiary of a company, or another organization.

In some embodiments, the gateway entity may have a trust relationship with at least one second entity. In these embodiments, the second entity may be a company, a business unit or subsidiary of a company different from a business unit or subsidiary with which the resource 140 is associated, or another organization. In some cases, the gateway entity may pre-authorize users associated with the gateway entity (e.g., the local user 105) to access the resource 140. In other cases, the second entity may pre-authorize users associated with the second entity (e.g., the local user 105) to access the resource 140.

While the nature of a trust relationship between entities will be described below, with reference to FIG. 5, non-limiting examples of trust relationships that can exist between parties include, but are not limited to: a contract between banks, allowing each others' customers to access each others' ATMs; a contract between service providers, allowing each others' customers to access each others' computer networks via terminals; a contract between a bank and a store, allowing the bank customers to access the point of sale terminals within the store (e.g. when using a credit card or debit card); and an agreement between companies allowing employees of a first company to physically access buildings belonging to a second company, for example, when the second company has contracted the first company for a project etc.

In any event, pre-authorization of a user, for example the local user 105, may be performed in a provisioning process described below. In the provisioning process, the local user 105 is provided with data and the possession of the data by the local user 105 is indicative of his/her pre-authorized status. Hence, when the data is supplied to the data input device 110, the local user 105 is recognized as a pre-authorized user and is given access to the resource 140.

The local user 105 is a user who is associated with the gateway entity or the second entity, and who has been pre-authorized for accessing the resource 140 by the entity with which he/she is associated. For example, the local user 105 may be a customer, an employee, a contractor, or another user in some other relationship with the entity with which he/she is associated. For instance, continuing with the non-limiting examples of trust relationships provided above, the local user 105 may be: a customer of a bank accessing an ATM associated with his/her bank; a customer of a first bank accessing an ATM associated with a second bank; a customer of a bank accessing a point of sale terminal in a store to pay for goods; an employee of a company accessing a building; or an employee of a first company accessing a building belonging to a second company, the second company having contracted the first company for a project.

Each of the entities in the trust relationship is assigned at least one unique entity identifier, G. In addition, each potential user (e.g., the local user 105) of the resource 140 has a unique user identifier, A. In the provisioning process, described below, each potential user of the resource 140 is provisioned with access data $F(G,A)$ and a key $U^*(A)$. Hence, the data supplied by the local user 105 may comprise the access data $F(G,A)$ and the key $U^*(A)$.

The access data $F(G,A)$ comprises data which may be processed by data input device 110 to determine if the local user 105 has been pre-authorized to access the resource 140. Further, the key $U^*(A)$ comprises data that assists in this determination. The key $U^*(A)$ may be unique to the local user 105, or may be a standard key that is common to all users pre-authorized to access the resource 140.

The data input device 110 acts as a gateway to the resource 140 via the access control module 120. In some embodiments, the access control module 120 comprises a software-based access control module, which permits access to the resource 140 upon receipt of a command from the data input device 110. In other embodiments, the access control module comprises a physical access control module, which permits access to the resource upon receipt of a command from the data input device 110. In a non-limiting example, in embodiments where the resource 140 comprises a physical access point, the access control module 120 may comprise a latch, such as a magnetic latch, which can be released upon receipt of a command from the data input device 110.

In one embodiment, the data input device 110, the access control module 120, and the record 130 may be co-located in single unit 160. In a non-limiting example, in embodiments where the resource 140 is an ATM, the single unit 160 may be, in turn, co-located with the ATM, to provide access control to the ATM. In other embodiments (not depicted), the data input device 110, the access control module 120, the record 130 and the resource 140 may be co-located in a single apparatus. In a non-limiting example, in embodiments where the resource 140 is an ATM, the data input device 110, the access control module 120, the record 130 may incorporated into a single unit such that the data input device 110, the access control module 120, the record 130 control access to a cash dispensing portion of the ATM.

In yet other embodiments (not depicted), the access control module 120 may be incorporated into the resource 140. Other physical combinations of the data input device 110, the access control module 120, the record 130 and the resource 140 are possible.

In some embodiments, the access data $F(G,A)$ may be stored on a tag 118 carried by the local user 105. For example, the tag 118 may comprise a contact tag requiring contact with the data input device 110 to effect communication between the tag and the data input device 110. Non-limiting examples of a contact tag include a magnetic swipe card, a smart card, a USB memory stick, a magnetic diskette, etc. In another example, the tag 118 may comprise a non-contact tag which communicates with the data input device 110 in a non-contact fashion (e.g. wirelessly), when the non-contact tag comes into proximity to the data input device 110. Non-limiting examples of a non-contact tag include an RFID (Radio Frequency Identification) tag, etc. Other types of tags, both contact and non-contact, will occur to one of skill in the art and are within the scope of the present invention.

In other embodiments, the access data $F(G,A)$ may be entered manually into the data input device 110 by the local user 105. For example, the access data $F(G,A)$ may comprise an alphanumeric string, which may be provided to the local user 105 for manual entry into the data input device 110 (e.g. via a keypad) to be discussed below.

In some embodiments, the key $U^*(A)$ comprises an alphanumeric string, which may be provided to, or chosen by, the local user 105 in the provisioning process (described below) for enabling access to the resource 140. In these embodiments, the key $U^*(A)$ may be provided to, or chosen by, the local user 105 as data intended for manual entry into the data input device 110 by the local user 105 (e.g. via a keypad), to be discussed below.

In other embodiments, also to be discussed below, the key $U^*(A)$ may be derived from biometric data retrievable from the local user 105 by the data input device 110. In these embodiments, the data input device 110 comprises a biometric unit, described below with reference to FIGS. 2a and 2b. In a non-limiting example, the key $U^*(A)$ may be derived from a scan of a body part of the local user 105, such as a finger print scan, a skin scan or an iris scan. The biometric data may be further processed to arrive at the key $U^*(A)$.

In yet other embodiments, the key $U^*(A)$ may comprise a combination of an alphanumeric string and biometric data.

In yet other embodiments, the key $U^*(A)$ may be stored on a tag different from tag 118, for example a non-contact tag or contact tag, as described above.

While in some embodiments the key $U^*(A)$ may also be stored in the tag 118, along with access data $F(G,A)$, embodiments where the key $U^*(A)$ is input into the data input device 110, separate from the access data $F(G,A)$, provide more security against malicious users. Hence in some embodiments where the key $U^*(A)$ is stored in the tag 118, along with access data $F(G,A)$, two separate processes may be required to retrieve the access data $F(G,A)$ and the key $U^*(A)$. In one non-limiting example, the tag 118 may comprise a non-contact portion and a contact portion, with the access data $F(G,A)$ stored in a memory accessible to the data input device 110 via a non-contact interaction with the tag 118, and the key $U^*(A)$ stored in a memory accessible to the data input device 110 via a contact interaction with the tag 118.

Figure 2B:
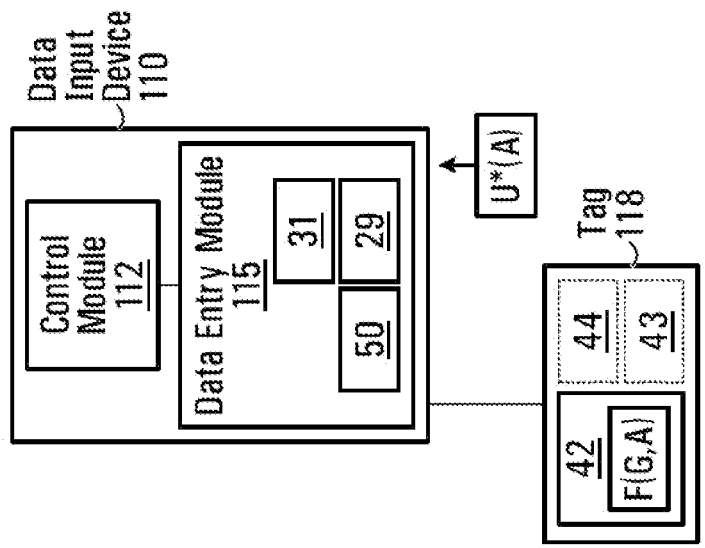
FIG. 2b depicts an interaction between a contact tag and a contact tag reader, according to a non-limiting embodiment of the present invention.
Figure 2A:
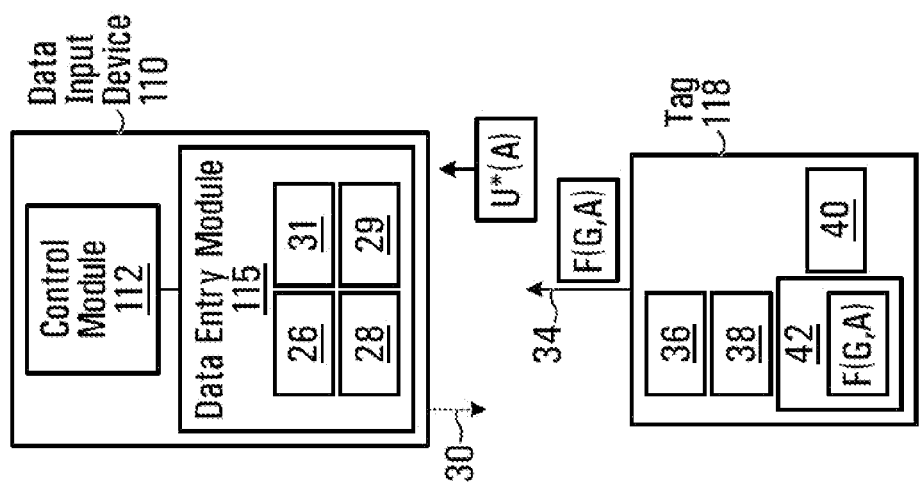
FIG. 2a depicts an interaction between a non-contact tag and a non-contact tag reader, according to a non-limiting embodiment of the present invention.

With additional reference to FIGS. 2a and 2b, the data input device 110 comprises a data entry module 115 and a control module 112. The data entry module 115 is adapted to collect data from the local user 105, including retrieving data from the tag 118, and accepting manual and/or biometric input from the local user 105. As such, the data entry module 115 is enabled to read access data F(G,A) from the tag 118, and to retrieve the key U*(A) from the user 105. The access data F(G,A) is stored on a memory portion 42 in the tag 118.

FIG. 2a depicts an embodiment where the tag 118 comprises a non-contact tag. To illustrate the function of a non-contact tag, the non-limiting example of an RFID tag is used. RFID tags may be active or passive devices, as known to one of skill in the art. Whether active or passive, RFID tags share several common elements, including the memory portion 42 for storing data, such as the access data F(G,A), a microchip 40, an antenna 36 and a transponder 38. In embodiments where the tag 118 comprises an active RFID tag, the tag 118 may also comprise a battery (not depicted).

In this embodiment, the data entry module 115 comprises the elements of a non-contact tag reader, for non-contact (e.g. wireless) retrieval of data from the tag 118, when the tag 118 is in proximity to the data input device 110. In some embodiments, the data input device 110 may be further enabled to write data to the tag 118 in a non-contact manner (e.g., wirelessly).

In the non-limiting example where the tag 118 is an RFID tag, the data entry module 115 comprises an RFID reader, including an antenna 28 and a broadcast interface 26. In some embodiments, the data input device 110 emits a query signal 30 which may be received by the tag 118. In embodiments where the tag 118 comprises a passive RFID tag, the query signal 30 comprises enough RF energy to charge the transponder 38, allowing the tag 118 to broadcast the access data F(G,A) stored in the memory 42 via a response signal 34. In embodiments where the tag 118 comprises an active RFID tag, the tag 118 may transmit the response signal 34 in response to the query 30, or may actively broadcast a signal similar to the response signal 34 in the absence of the query 30.

In embodiments where the key U*(A) comprises an alphanumeric string, the data entry module 115 comprises a manual data entry apparatus 29 to enable a user to manually enter the key U*(A) into the data input device 110. In some embodiments, the manual data entry apparatus 29 may comprise a keyboard or keypad for accepting alphanumeric input.

In embodiments where the key U*(A) comprises biometric data retrievable from a user, the data entry module 115 comprises a biometric scanner 31 for retrieving biometric data from a user. For example, the biometric scanner 31 may comprise a fingerprint scanner, a skin scanner or an iris scanner. Other biometric scanners will occur to one of skill in the art and are within the scope of the present invention. The biometric scanner 31 is adapted to retrieve biometric data from a user, the key U*(A) being derivable from the biometric data by either the control module 112 or the biometric scanner 31 by, for example, applying a hash function to the biometric data.

In yet other embodiments, the data entry module 115 may comprise both the biometric scanner 31 and the manual data entry apparatus 29. In these embodiments, the key U*(A) may comprise a combination of biometric data and manually entered data. However, in these embodiments, the key may comprise one of biometric data or manually entered data, with the other data being used as an additional level of security, to be discussed below.

The control module 112 may comprise a computing apparatus for processing the access data F(G,A) and the key U*(A). Details of the processing which occurs in the control module 112 are discussed below.

Turning to FIG. 2b, an embodiment of the data input device 110 where the tag 118 comprises a contact tag is now described. In this embodiments, the tag 118 again comprises the memory portion 42 for storing data. In embodiments where the tag 118 comprises a magnetic swipe card, the memory portion 42 comprises a magnetic strip on the swipe card. In embodiments where the tag 118 comprises a smart card, the memory portion 42 comprises an electronic memory. In these embodiments, the tag 118 may further comprise a microchip 43 and an interface 44 for coupling to the data input device 110.

In these embodiments, the data entry module 115 of the data input device 110 comprises a contact reader 50 for retrieving data from the memory 42 of the tag 118, the contact reader 50 being complementary to the tag 118. For example, in embodiments where the tag 118 comprises a magnetic swipe card, the contact reader 50 comprises a magnetic swipe card reader. In embodiments where the tag 118 comprises a smart card, the contact reader 50 comprises a smart card reader.

In yet other embodiments (not depicted), where the tag 118 comprises a barcode, the barcode comprising an optical representation of the access data F(G,A), the data entry module 115 will comprise a barcode reader.

In other embodiments, the access data F(G,A) may not be stored on a tag, but may entered into the data entry module 115 via the manual data entry apparatus 29, described above.

To enable desired operation to occur, the access data F(G,A) is assembled and provided to a user, during a provisioning phase which will now be described with reference to FIGS. 3 and 4. The system of FIG. 3 will be operated by an entity, to provide a potential user of the system of FIG. 1 with the access data F(G,A) and establish the potential user's key U*(A). In some embodiments, the entity may be the gateway entity, which operates the resource 140 of FIG. 1. However, in other embodiments, the entity may be a second entity with which the gateway entity has a trust relationship.

The access data F(G,A) comprises various data fields which contain information pertaining to both a potential user of the system of FIG. 1 and the entity with which the potential user is associated. The format of the various data fields of the access data F(G,A) may vary in different embodiments of the invention, as long as the format to be used is understood by the various elements of the systems described with reference to FIGS. 1, 2 and 3 which process the access data F(G,A).

As discussed above, each potential user has a unique user identifier, A. In addition, each potential user has as an associated personal identifier E(A). Non-limiting embodiments of the unique user identifier A and the associated personal identifier E(A) include alphanumeric codes that can be expressed digitally, for example as sequences of bits.

Figure 3:
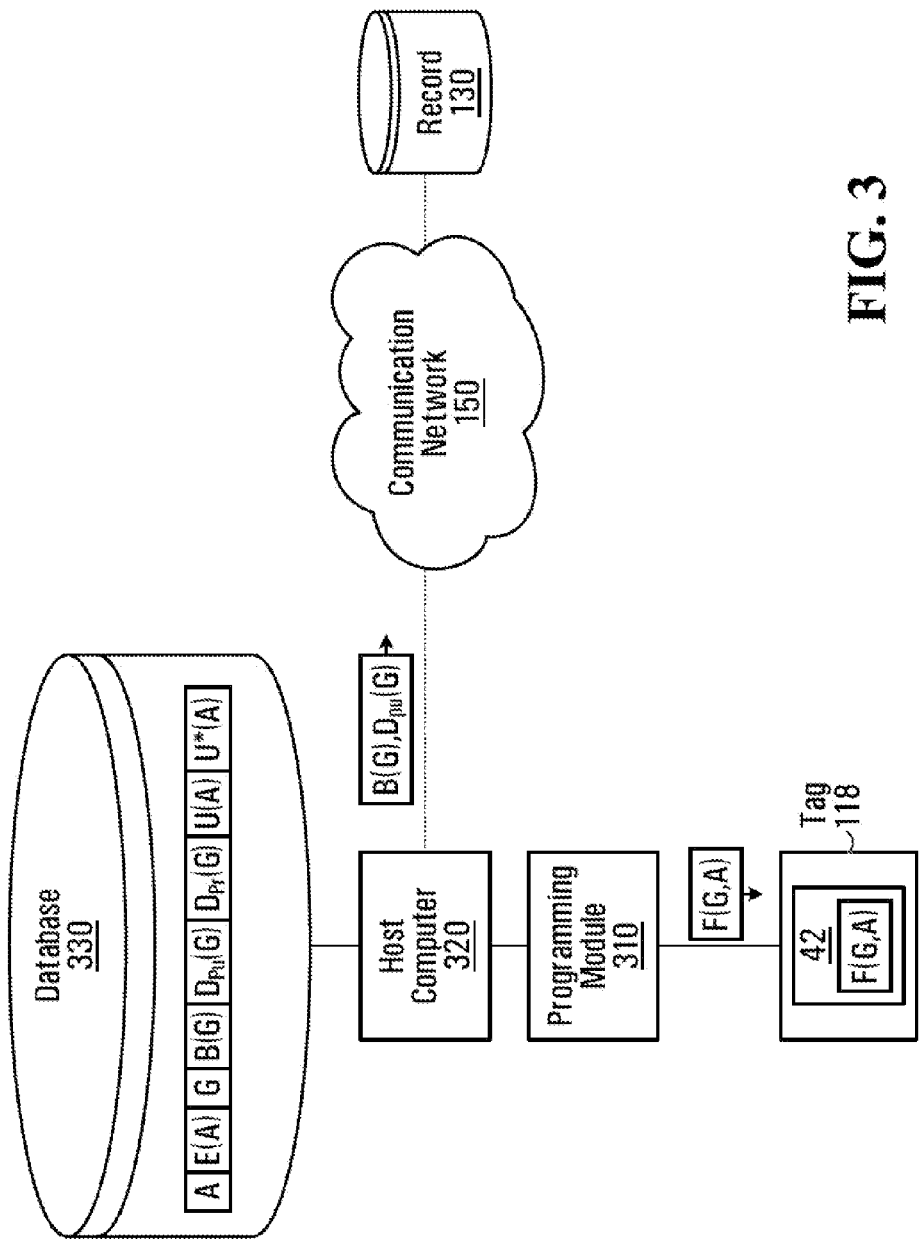
FIG. 3 depicts a provisioning architecture, according to a non-limiting embodiment of the present invention.
Figure 4:
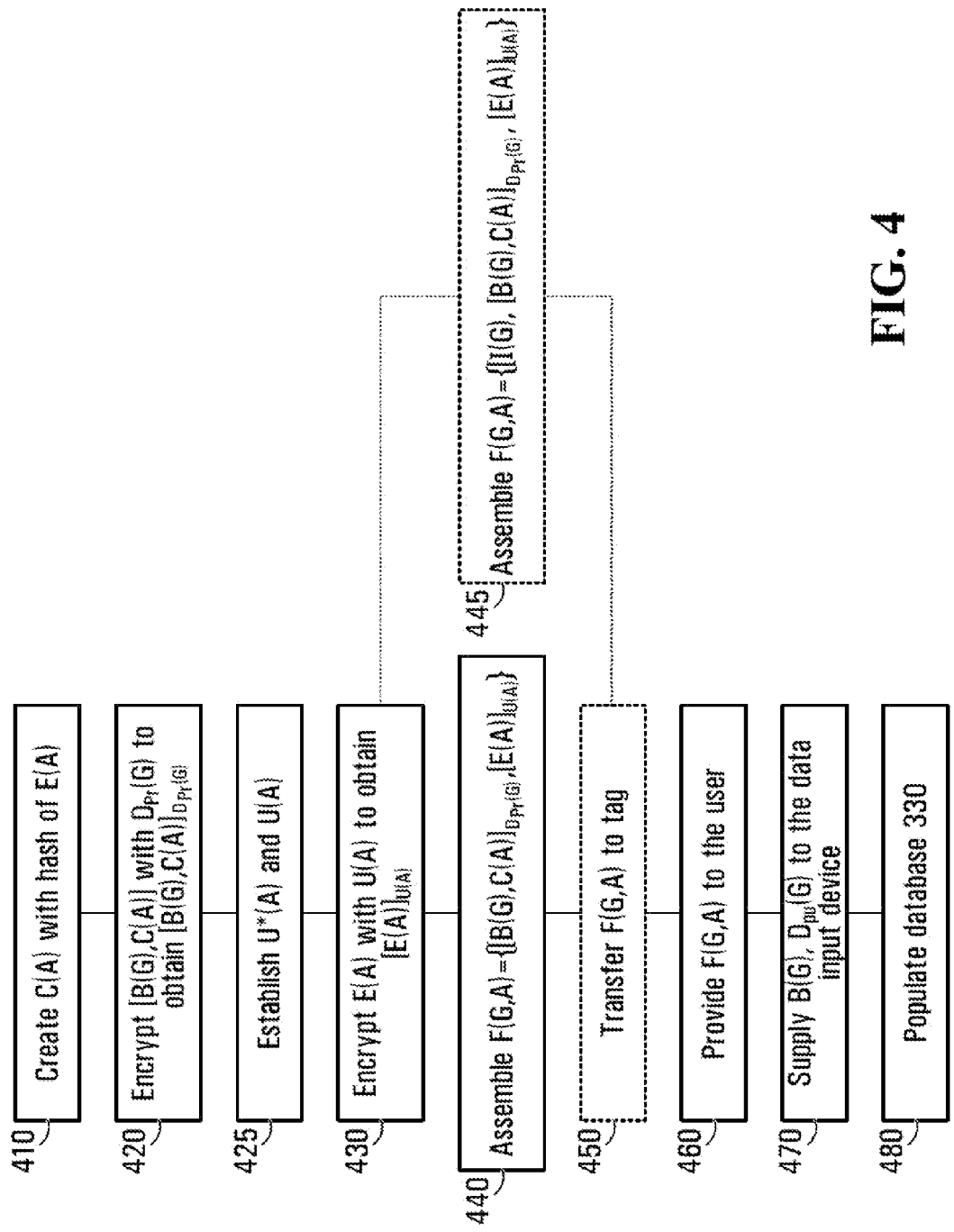
FIG. 4 depicts a method for provisioning data, according to a non-limiting embodiment of the present invention.

While the personal identifier E(A) may or may not be known to the user associated with the unique user identifier, A, this information is known to a host computer 320, as depicted in FIG. 3.

In some embodiments, the host computer 320 is in communication with a programming module 310, enabled to write data to the tag 118. The host computer 320 is in further communication with a database 330. The data which is to be stored on the tag 118 is assembled at the host computer 320, written to the tag 118 via the programming module 310, and stored at the database 330. In an alternative embodiment, the host computer 320 may cause portions of the data to be printed, communicated via e-mail, etc., such that the data may be provided to the user.

As will be discussed in more detail below, one of the data fields of the access data F(G,A) comprises an encrypted personal identifier $[E(A)]_{U(A)}$, which may be generated by encrypting the personal identifier E(A) with a key U(A). As will be discussed shortly, $[E(A)]_{U(A)}$ may be decrypted using the key U*(A), the key U(A) being complementary to the key U*(A).

During the provisioning phase, the key U*(A) is established with the potential user, for later input into the data entry module 115. In some embodiments, the key U*(A) may be assigned to the user, while in other embodiments the key U*(A) may be chosen by the user. In yet other embodiments, the key U*(A) may comprise biometric data retrieved from the user by a biometric scanner (not depicted), similar to the biometric scanner 31 described above, in communication with either the programming module 310 or the host computer 320.

In some embodiments, the key U(A) and the key U*(A) may be symmetric (e.g. the same alphanumeric string). In other embodiments, the key U(A) and the key U*(A) may be asymmetric. In these embodiments, the host computer 320 or the programming module 310 may generate the key U(A) based on the key U*(A). For example, in embodiments where the key U*(A) is chosen by the potential user, or is comprised of biometric data, the key U*(A) must be received from the local user 105 prior to the generation of the key U(A). In any event, [E(A)]U(A) may be decrypted using the key U*(A).

Further, as discussed above, the entity operating the system depicted in FIG. 3 is assigned at least one unique entity identifier, G, as well as an associated unique group identifier B(G), which identifies the entity as a member of a trust relationship. Examples of trust relationships will be described below with reference to FIG. 5. Non-limiting embodiments of the unique entity identifier G and the associated group identifier B(G) include alphanumeric codes that can be expressed digitally, for example as sequences of bits.

In some embodiments, each entity may include a plurality of sub-entities, for example different departments, business units, subsidiaries, customer groups (for example gold rated customers, silver rated customers etc.), etc. In these embodiments, each of the sub-entities corresponding to a particular entity may be assigned a unique sub-entity identifier Ga, Gb, Gc, etc., each of the plurality of unique sub-entity identifiers being associated with a sub-entity of the entity. Correspondingly, in this embodiment, each subgroup may be assigned a unique sub-group identifier B(Ga), B(Gb), B(Gc), etc. each corresponding to the associated unique sub-entity identifier, Ga, Gb, Gc, etc.

The steps in provisioning a potential user of the system described in FIG. 1 with the access data F(G,A) and the key U*(A) are now described with reference to FIG. 4, in one embodiment of the present invention. The steps of FIG. 4 may be executed by the host computer 320, the programming module 310 or both.

At step 410, a representation of E(A), denoted C(A), is derived from the personal identifier E(A) by applying a hash to the personal identifier E(A). As known to one of skill in the art, a hash comprises a mathematical formula applied to alphanumeric data, often to arrive at a value which is shorter than the original alphanumeric data. In some embodiments, the hash applied to the personal identifier E(A) may comprise a subset of the personal identifier E(A). In one embodiment, this subset may comprise a truncation of the personal identifier E(A). In other embodiments, the hash may comprise a summation of specific subsets of the personal identifier E(A). Other hashes of the personal identifier may occur to one of skill in the art. In any event, the hash is applied to the personal identifier E(A) and to calculate the representation C(A). The hash applied must also be known to the control module 112, for reasons which will be discussed below. Step 410 may be performed by the host computer 320 or by the programming module 310.

At step 420, the representation C(A) is appended to the unique group identifier B(G) to create a data string [B(G),C(A)] which is then encrypted using a key $D_{PR(G)}$ to yield an encrypted data string $[B(G),C(A)]_{D_{PR(G)}}$, the key $D_{PR(G)}$ being associated with the entity operating the system of FIG. 3. It should be noted that that the key $D_{PR(G)}$ used to encrypt [B(G),C(A)] is associated with a complementary key $D_{PU}(G)$ which may be used to decrypt data that was encrypted using the key $D_{PR(G)}$. For example, $[B(G),C(A)]_{D_{PR(G)}}$ can be decrypted using the complementary key $D_{PU}(G)$ to yield [B(G),C(A)]. Indeed, possession of $D_{PU}(G)$ may then enable the subsequent derivation of both B(G) and C(A), by applying decryption to $[B(G),C(A)]_{D_{PR(G)}}$. Embodiments of the key $D_{PR(G)}$ and the complementary key $D_{PU}(G)$ will be discussed below. In some embodiments, other values may be incorporated/added to the data string [B(G),C(A)] prior to encryption. In one embodiment, the hash used at step 410 may be incorporated/added to the data string [B(G),C(A)]. Other values which may be incorporated/added to the data string [B(G),C(A)] are described below.

At step 425, the key U*(A) is established with the potential user. As described above, in some embodiments, the key U*(A) may be assigned to the potential user, in other embodiments the key U*(A) may be chosen by the potential user, while in other embodiments, the key U*(A) may comprise biometric data retrieved from the potential user by a biometric scanner. Also, at step 425, the key U(A) is established. In embodiments where U*(A) and U(A) are symmetric keys, U(A) and U*(A) may comprise the same alphanumeric string, as described above. In embodiments where U*(A) and U(A) are asymmetric keys, one of U*(A) or U(A) is first established, and then used to generate the other of the asymmetric keys via a key generation algorithm as known to one of skill in the art.

At step 430, the personal identifier E(A) is encrypted using the key U(A) to obtain the encrypted personal identifier $[E(A)]_{U(A)}$.

At step 440, in one embodiment of the present invention, the access data F(G,A) is assembled by appending separate portions $[E(A)]_{U(A)}$ and $[B(G),C(A)]_{D_{PR(G)}}$ to one another such that $F(G,A)=\{[B(G),C(A)]_{D_{PR(G)}}, [E(A)]_{U(A)}\}$. Other embodiments of the invention may use other formats of the access data F(G,A), as long as the format to be used is understood by the elements of the systems described with reference to FIGS. 1, 2 and 3 which process the access data F(G,A) (for example, the programming module 310 and the data input device 110).

Optionally, the access data F(G,A) may have a format which includes a unique index I(G) associated with the entity having the unique entity identifier G. In these embodiments, the unique index I(G) may be used in the interaction of the potential user with the data input device 110 to reference data contained in the record 130 (described below with reference to FIGS. 6 and 7b). Further, in these embodiments, the unique index I(G) may correspond to the unique entity identifier G associated with the entity, however, in other embodiments; the unique index may comprise another alphanumeric identifier.

Hence, in embodiments in which the format of the access data F(G,A) includes a unique index I(G), step 440 may not be performed, in favor of step 445. In these embodiments, the access data F(G,A) has a format which includes the unique index I(G), and hence the access data is assembled by appending [B(G),C(A)]$_{DPR(G)}$ and [E(A)]$_{U(A)}$ to the unique index I(G), such that F(G,A)={I (G), [B(G),C(A)]$_{DPR(G)}$, [E(A)]$_{U(A)}$}. Other embodiments of the invention may use other formats of the access data F(G,A), as long as the format to be used is understood by the elements of the systems described with reference to FIGS. 1, 2 and 3 which process the access data F(G,A) (for example, the programming module 310 and the data input device 110).

In embodiments which use the tag 118, at step 450, the access data F(G,A) is supplied to the programming module 310, and subsequently transferred to the tag 118 by an interaction between the programming module 310 and the tag 118. The method for transferring the access data F(G,A) to the tag 118 is dependent on the type of tag 118 and programming module 310 used.

For example, in embodiments where the tag 118 comprises a non-contact tag, the access data F(G,A) may be transferred to the tag 118 via a wireless write command originating at the programming module 310 and containing the access data F(G,A). In these embodiments, this wireless write command may be triggered by an administrator of the programming module 310, by the proximity of the tag 118 to the programming module 310, or other methods which will occur to one of skill in the art. In some embodiments, the non-contact tag may include a contact programming unit which may enable the non-contact tag to accept the write command by placing the non-contact tag into contact with the programming module 310.

In embodiments where the tag 118 comprises a contact tag, the tag 118 may be placed into contact with the programming module 310 to allow the programming module 310 to transmit a write command, containing the access data F(G,A), to the tag 118.

In embodiments, which do not use the tag 118, step 450 is not performed.

At step 460 the access data F(G,A) is provided to the potential user, either via the tag 118 (i.e. the tag 118 is provided to the potential user) or, in embodiments that do not use the tag 118, via a paper printout, via an IVR system, etc.

At step 470, the unique group identifier B(G) and the key $D_{PU}(G)$ are made accessible to the data input device 110. For example, this may be achieved by providing the unique group identifier B(G) and the key $D_{PU}(G)$ to the record 130 depicted in FIG. 1, for instance, by transmitting the unique group identifier B(G) and the key $D_{PU}(G)$ to the record 130 for storage therein. In some embodiments, the host computer 320 may be coupled to the communication network 150, and hence the unique group identifier B(G) and the key $D_{PU}(G)$ may be transmitted through the communication network 150 to the system depicted in FIG. 1 for storage in the record 130. While the record 130 is depicted in FIG. 3 as being connected to the communication network 150, the unique group identifier B(G) and the key $D_{PU}(G)$ may be transmitted to the record 130 via other elements of the system depicted in FIG. 1 that are in communication with the communication network 150. In other embodiments, the unique group identifier B(G) and the key $D_{PU}(G)$ may be transmitted to the record 130 via a different communication network. In yet other embodiments, the unique group identifier B(G) and the key $D_{PU}(G)$ may be manually entered into the record 130, for example, printing the unique group identifier B(G) and the key $D_{PU}(G)$, transporting the data to the system depicted in FIG. 1, and manually entering the data into the record 130. In other embodiments, the unique group identifier B(G) and the key $D_{PU}(G)$ may be recorded onto a transportable media, such as a contact tag or non-contact tag, similar to those described above, and transported to the record 130. In these embodiments, the record 130 may be in communication with apparatus for reading the transportable media to effect receiving the unique group identifier B(G) and the key $D_{PU}(G)$. Further, in these embodiments, the programming module 310 of FIG. 3 may be configured with an apparatus for writing the unique group identifier B(G) and the key $D_{PU}(G)$ to the transportable media. In some embodiments, this apparatus may be the same apparatus for writing F(G,A) to the tag 118, while in other embodiments the programming module 310 may be configured with different apparatus.

At step 480, the database 330 is populated with data pertaining to the potential user. As depicted in FIG. 3, data stored at the database 330 may comprise the unique user identifier A, the unique personal identifier E(A), the unique entity identifier G, the unique group identifier B(G), the key $D_{PU}(G)$, the key $D_{PR}(G)$, the key U(A), and the key U*(A) and/or other data associated with the potential user. Examples of other data that may be associated with the user will be described below.

In some embodiments, step 480 may precede step 470, while in other embodiments, step 470 and step 480 may proceed concurrently.

In some embodiments, the access data F(G,A) may comprise the key U(A), for example, in the event that encrypted data needs to be appended to the access data F(G,A) in a later process such that the encrypted data may yet still later be accessed via the key U*(A). An example of this situation will be described with reference to FIG. 9b. In these embodiments, the key U(A) may be encrypted using the key $D_{PR(G)}$ and appended to other components of the access data F(G,A) such that F(G,A)={[B(G),C(A)]$_{DPR(G)}$, [U(A)]$_{DPR(G)}$, [E(A)]$_{U(A)}$}. In other embodiments, the key U(A) may be appended to the data string [B(G), C(A)] prior to encryption at step 420, such that F(G,A)={[B(G),C(A),U(A)]$_{DPR(G)}$, [E(A)]$_{U(A)}$}. In other embodiments, the key U(A) may be encrypted using the key U(A) (i.e. itself) such that the access data may be viewed as F(G,A)={[B(G),C(A)]$_{DPR(G)}$, [E(A)]$_{U(A)}$, [U(A)]$_{U(A)}$} or F(G,A)={[B(G),C(A)]$_{DPR(G)}$, [E(A),U(A)]$_{U(A)}$}. In these embodiments, providing the key U(A) in the access data F(G,A) enables the data input device 110 to obtain the key U(A), in the event that the data may be written to the tag 118 (or alternatively provided to the local user 105) in an encrypted state, as will be described below.

In other embodiments, steps 425 and 430 may be omitted, and hence E(A) may not be encrypted and the access data F(G,A) may be viewed as F(G,A)={[B(G),C(A)]$_{DPR(G)}$, E(A)}. In these embodiments, the user may be provided with, or may choose, a password or PIN, PASS(A), for example, an alphanumeric string. Further, the PASS(A) may be encrypted using the key $D_{PR}(G)$ such that the access data F(G,A)={[B(G),C(A),PASS(A)]$_{DPR(G)}$, E(A)}. When the access data F(G,A) is later received at the data input device 110, as described below with reference to FIGS. 7a, 7b and 7c, [B(G), C(A),PASS(A)]$_{DPR(G)}$ may be decrypted, and the decrypted PASS(A) may be compared to the PASS(A) entered by the user. Hence, an additional layer of security is provided. In these embodiments, [B(G),C(A)]$_{DPR(G)}$ or [B(G),C(A),PASS (A)]$_{DPR(G)}$ may only be decrypted if the key $D_{PU}(G)$ has been obtained from the entity which effected encryption of [B(G), C(A)]$_{DPR(G)}$ or [B(G),C(A),PASS(A)]$_{DPR(G)}$.

In yet other embodiments, the host computer 320 or the programming module 310, or another apparatus in communication with the host computer 320 and/or the programming module 310, may comprise a random number generator. In these embodiments, a random number R may be generated and incorporated into the access data F(G,A). In these embodiments, the access data F(G,A) may be F(G,A)={[B(G),C(R),E(A)]$_{DPR(G)}$, R}, where a value C(R) comprises a hash of R, and E(A) is encrypted using the key $D_{PR(G)}$. To provide an additional layer of security to these embodiments, the random number R may be further encrypted using the key U(A), such that the access data may be F(G,A)={[B(G),C(R), E(A)]$_{DPR(G)}$, [R]$_{U(A)}$}. In these embodiments, [B(G),C(R),E(A)]$_{DPR(G)}$ may only be decrypted if the key $D_{PU}(G)$ has been obtained from the entity which effected encryption of [B(G), C(R),E(A)]$_{DPR(G)}$.

Figure 5:
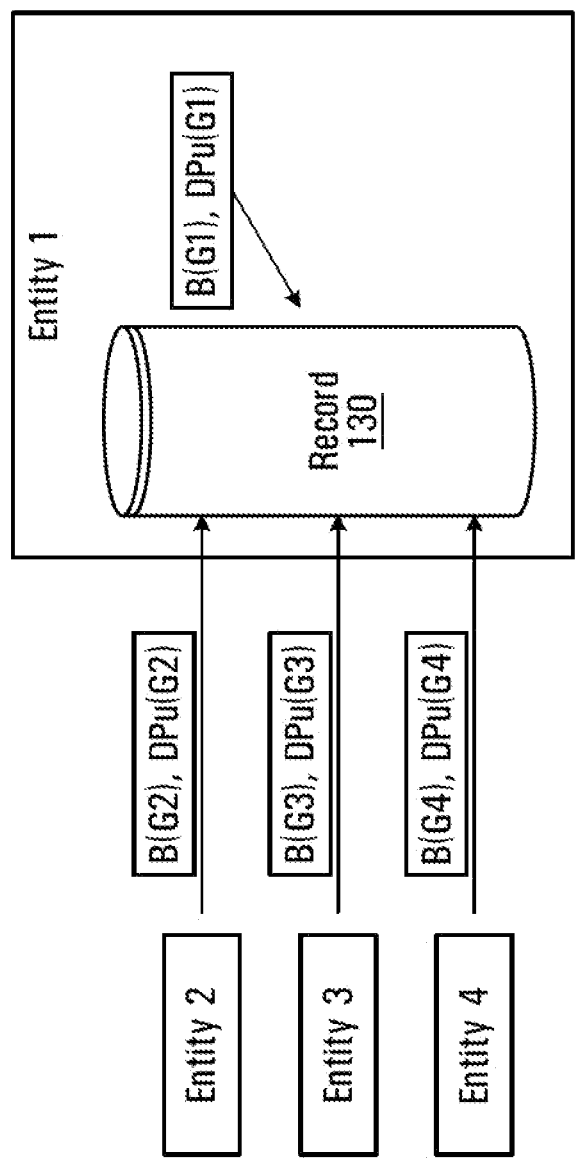
FIG. 5 depicts an example of a bust relationship between entities, according to a non-limiting embodiment of the present invention.

Reference is now made to FIG. 5 which depicts an example of a trust relationship that may exist between entities, in an embodiment of the present invention. In this example, there are four entities, namely Entity 1, Entity 2, Entity 3, and Entity 4. Each of these entities will have a unique entity identifier, G1, G2, G3 and G4, respectively, and a unique group identifier B(G1), B(G2), B(G3) and B(G4), respectively. It is assumed in this example that users associated with each of the entities have been assigned unique access data, for example F(G1,A) for users associated with Entity 1, F(G2,A) for users associated with Entity 2, etc., via the provisioning phase described with reference to FIGS. 3 and 4. Further, it is assumed in this example that each of the entities has an associated unique key, $D_{PU}(G1)$, $D_{PU}(G2)$, etc., for decrypting the at least a portion of the data in each of F(G1,A), F(G2,A), for example [B(G1),C(R)]$_{DPR(G1)}$, [B(G2),C(R)]$_{DPR(G2)}$ etc. In some embodiments, however, subsets of entities, for example Entity 1 and Entity 2, may share the same key $D_{PU}(G12)$ While this example depicts four entities, the number of entities may be as few as one and the invention is not limited to any number of entities.

In the example depicted in FIG. 5, it is assumed that the resource 140 of FIG. 1 is associated with Entity 1, and the data input device 110, the access control module 120 the data input device 110, and the record 130 are also associated with Entity 1. Entity 1 enters into a trust relationship with Entity 2, Entity 3, etc., and agrees to allow users associated with these other entities to access the resource 140, upon verification that the users have been pre-authorized by the entity with which each user is associated, as described below. In a non-limiting example of an aspect of the trust relationship, Entity 1 may form agreements (e.g. contracts) with the other entities agreeing to let users associated with the other entities access the resource 140. In this example, Entity 1 assumes/trusts that each of the other entities will pay any fees associated with the access of the resource 140 by users associated with that other entity. Further, in this example, Entity 1 assumes/trusts that the users associated with the other entities will use the resource 140 responsibly. As a result of this trust, Entity 1 allows each of the other entities to pre-authorize their users for access to the resource 140. To facilitate this, each of the other entities supplies Entity 1 with data which will enable Entity 1 to verify this pre-authorization.

Practically, then, Entity 1 is supplied with data from the other entities which will allow it to verify the pre-authorization, and hence grant requests to access the resource 140 by users associated with the other entities as well as, in some embodiments, users associated with Entity 1.

In one embodiment, each entity supplies usage data associated with a user accessing the resource, for example the unique group identifier B(G) associated with the entity and the associated key $D_{Pu}(G)$, to Entity 1. For example, Entity 2 supplies B(G2) and $D_{Pu}(G2)$ to Entity 1, and so on. It is assumed, in this embodiment, that potential users wishing to access the resource 140 are in possession of the access data F(G,A) and the key U*(A). It is noted, however, that in some embodiments the provisioning phase, described with reference to FIGS. 3 and 4, may occur after the exchange of data between the entities in the trust relationship, while in other embodiments the provisioning phase may occur prior to the exchange of data between the entities in the trust relationship.

As depicted in FIG. 6, the data supplied to Entity 1 is used to populate the record 130. In this embodiment, the record 130 comprises a plurality of entries 610a, 610b, etc., each entry associated with one of the entities that is in the trust relationship established with Entity 1. A given entry, for example entry 610a, in the record 130 comprises a first field 620 comprising the unique group identifier B(G) of the entity with which the given entry is associated. The unique group identifiers B(G) stored in the first field 620 will act as a reference group identifier for embodiments of the invention described below with reference to FIGS. 7a, 7b, 7c, and 7d. The given entry further comprises a second field 630 comprising the key $D_{PU}(G)$, for decrypting the portion of the access data F(G,A) encrypted with the complementary key $D_{PR(G)}$. In some embodiments, the key $D_{PU}(G)$ may be common to some of the entities. In other embodiments, the key $D_{PU}(G)$ may be common to all of the entities. In these embodiments, the key $D_{PU}(G)$ may be stored in a reference field that is understood to be common for all the entities, and the field 630 may be omitted.

In embodiments where the access data F(G,A) further comprises the unique index I(G) (each I(G) associated with a given entity), the entry in the record 130 that is associated with a given entity may also comprise a field 640* for storing the unique index I(G) associated with that given entity. In these embodiments, the data which is stored in the field 640* may be exchanged between the entities in the trust relationship while the other data used to populate the record 130 is being exchanged. In the embodiments where the field 640* comprises a unique index, this unique index may be generated by Entity 1 and supplied to each of the other entities, or it may be generated by each of the other entities and supplied to Entity 1 when the other data used to populate the record 130 is being exchanged (i.e. at step 470 of FIG. 4).

Each of the remaining entries 610b, 610c, 620d, and 610e is associated with one of the entities depicted in FIG. 5. In some embodiments, other entities, for example Entity Z, may join the trust relationship between Entity 1, Entity 2, Entity 3 and Entity 4 of FIG. 5, and hence row 610f depicts further data that may be added to the record 130 when the Entity Z joins the trust relationship. Further, if an entity leaves the trust relationship, the data corresponding to that entity may be removed or deleted from the record 130. Alternatively, the record 130 may comprise an additional column (not depicted) indicating whether a specific entity is inside or outside the trust relationship.

In some embodiments, the record 130 may be stored in a memory (no depicted) of the data input device 110.

As described above, the key $D_{PU}(G)$ and the key $D_{PR(G)}$ are complementary keys, where the key $D_{PU}(G)$ is for decrypting data which has been encrypted using the key $D_{PR(G)}$. In some embodiments, the key $D_{PU}(G)$ and the key $D_{PR(G)}$ are symmetric keys (i.e. the key $D_{PU}(G)$ and the key $D_{PR(G)}$ are identical alphanumeric strings). In these embodiments, the key $D_{PU}(G)$ and the key $D_{PR(G)}$ are not limited to a specific length. However, keys of a longer length may be more challenging for hackers/malicious users to guess. For example, in some embodiments, the key $D_{PU}(G)$ and the key $D_{PR(G)}$ may comprise a 128 bit (or longer) alphanumeric string.

In other embodiments, the key $D_{PU}(G)$ and the key $D_{PR(G)}$ are asymmetric keys. For instance, the key $D_{PU}(G)$ and the key $D_{PR(G)}$ may be complementary public and private keys, respectively. In some embodiments, the complementary public and private keys may be public key infrastructure (PKI) keys.

Embodiments of the system described in FIGS. 1 and 2 will now be referenced to describe a method for accessing the resource 140 based on "candidate data" supplied by a candidate user. In some instances, the candidate user may be a user, such as the local user 105, who is pre-authorized to access the resource 140, as described above, in which case the candidate data will be valid. In other instances, the candidate user may be a user who is not pre-authorized to access the resource 140, in which case the candidate data will be invalid. Thus, it is of interest whether the candidate data is valid in order to grant or deny access to the resource.

In a first example, the candidate data (when valid) may contain first data (e.g., $[B(G),C(A)]_{DPR(G)}$) and second data (e.g., $[E(A)]U(A)$) that are separate portions. In a second example of valid candidate date, the second data (e.g., $[E(A), [B(G),C(A)]_{DPR(G)}]_{U(A)}$) contains the first data (e.g., $[B(G), C(A)]_{DPR(G)}$) In a third example of valid candidate data, the first data (e.g., $[[E(A)]_{U(A)}B(G)C(A)]_{DPR(G)}$) contains the second data (e.g., $[E(A)]_{U(A)}$). Valid candidate data may also contain a candidate key (e.g., $U^*(A)$). Other examples of the structure of the candidate data are of course possible.

The method broadly includes acquiring the candidate data in one of its forms, in association with a request for accessing a resource (e.g. resource 140), where the candidate data comprises first data and second data. The method then includes processing the first data with a first key (e.g. the key $D_{PU}(G)$) in an attempt to effect decryption of the first data, to obtain first processed data (e.g., $[B(G),C(A)]$), as well as processing the second data with a second key (e.g. the key $U^*(A)$) in an attempt to effect decryption of the second data, to obtain second processed data (e.g., $[E(A)]$). Finally, the method includes granting the request when the candidate data is valid, i.e., if a pre-determined portion of the first processed data (e.g., $C(A)$) is derivable from the second processed data (e.g., $E(A)$).

Figure 7A:
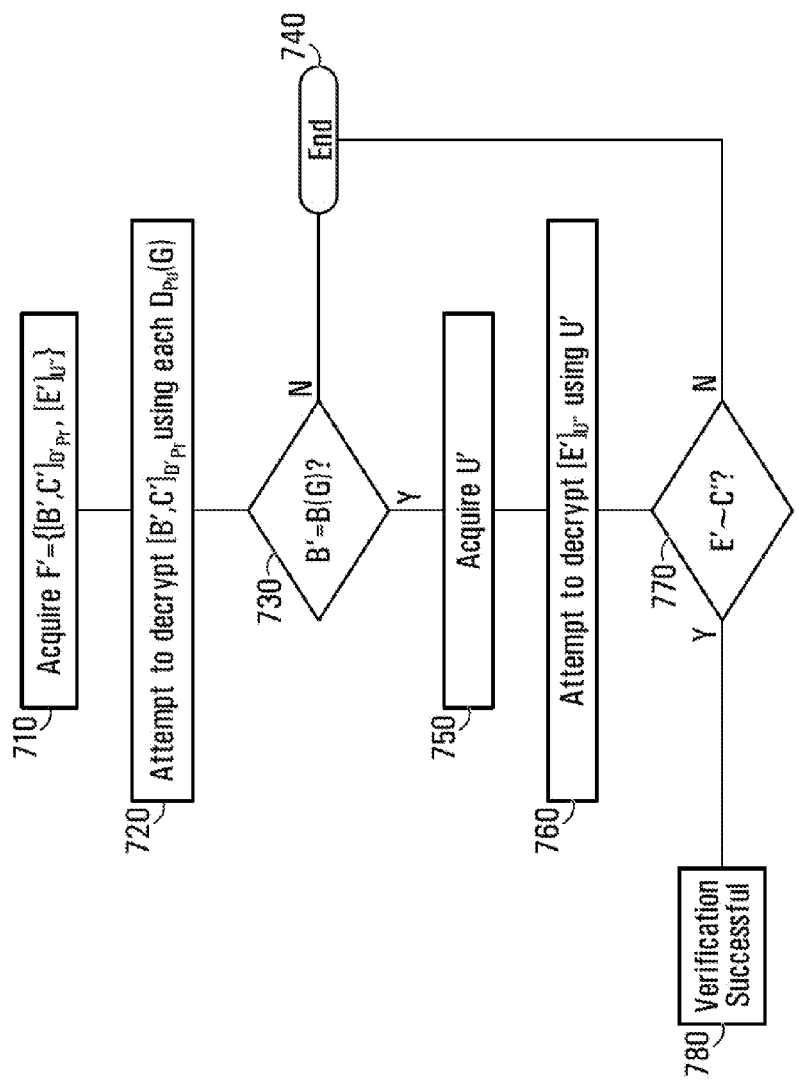
FIG. 7a depicts a method for accessing a resource based on data supplied by a local user, according to a non-limiting embodiment of the present invention.
Figure 7B:
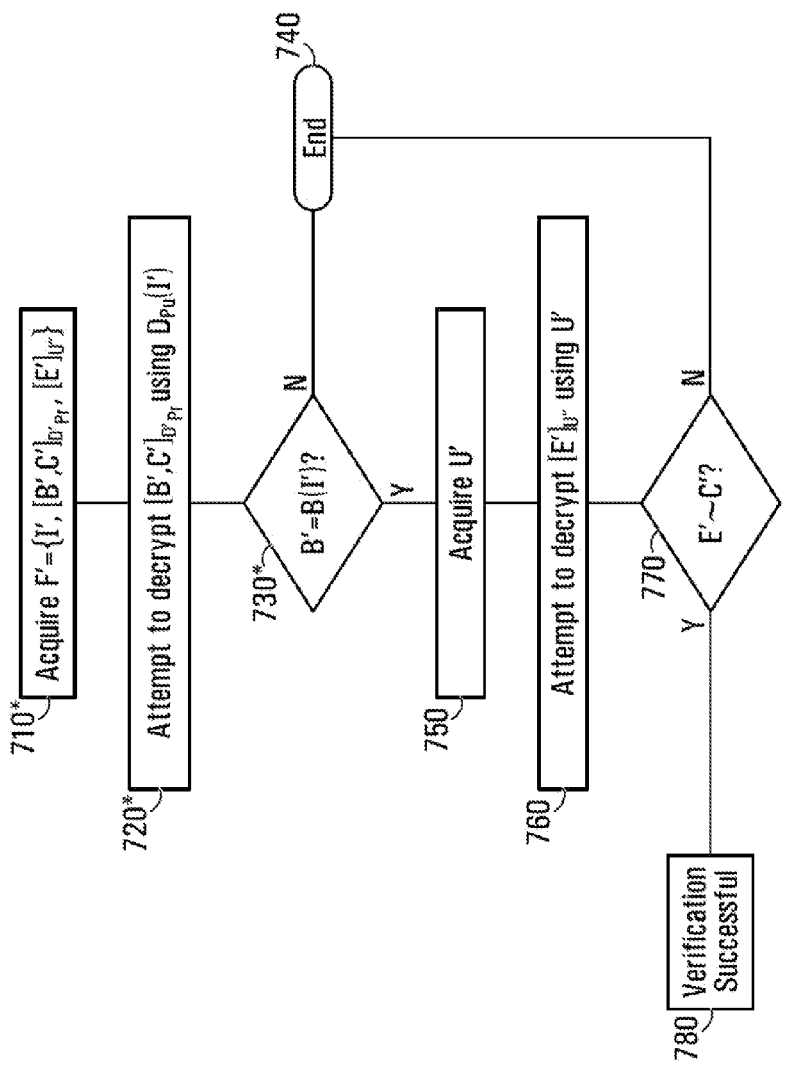
FIG. 7b depicts a method for accessing a resource based on data supplied by a local user, according to a non-limiting embodiment of the present invention.
Figure 7C:
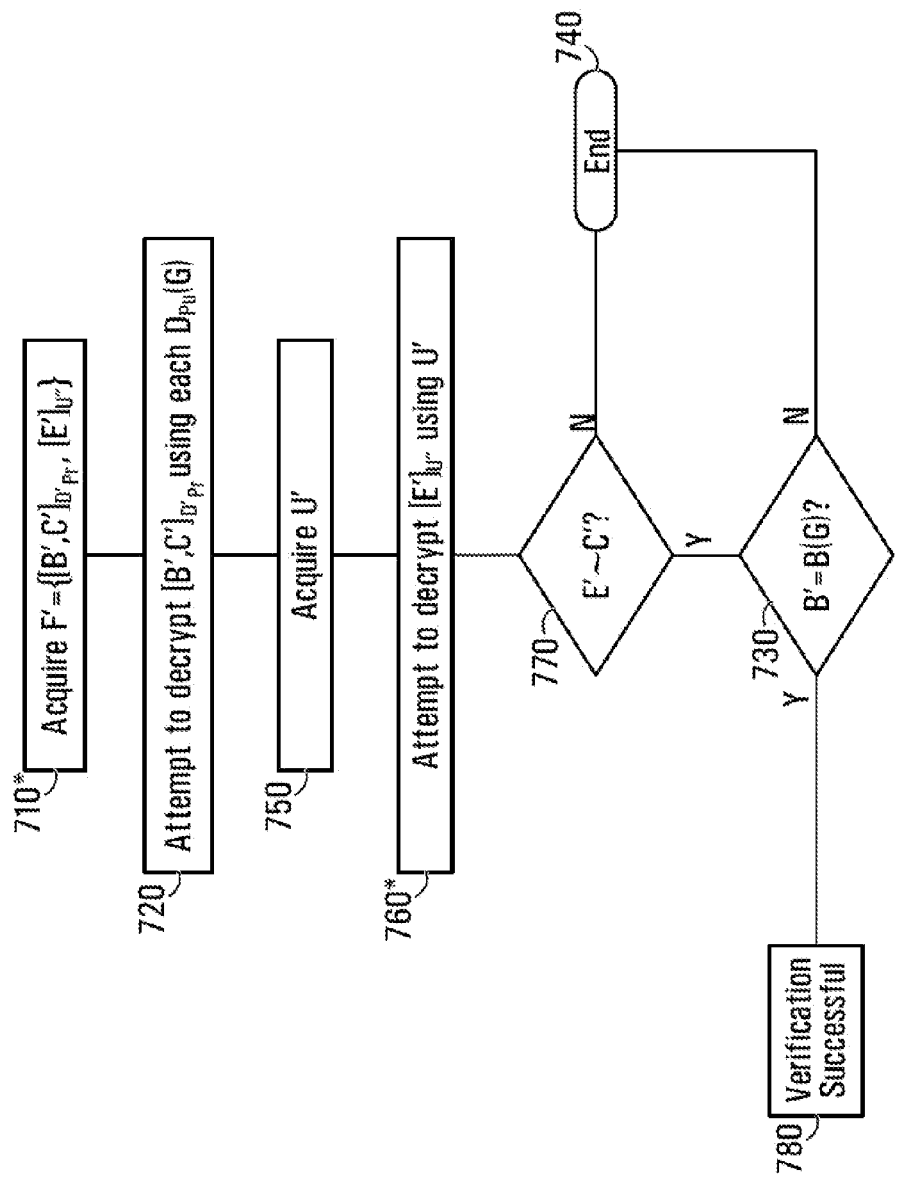
FIG. 7c depicts a method for accessing a resource based on data supplied by a local user, according to a non-limiting embodiment of the present invention.
Figure 7D:
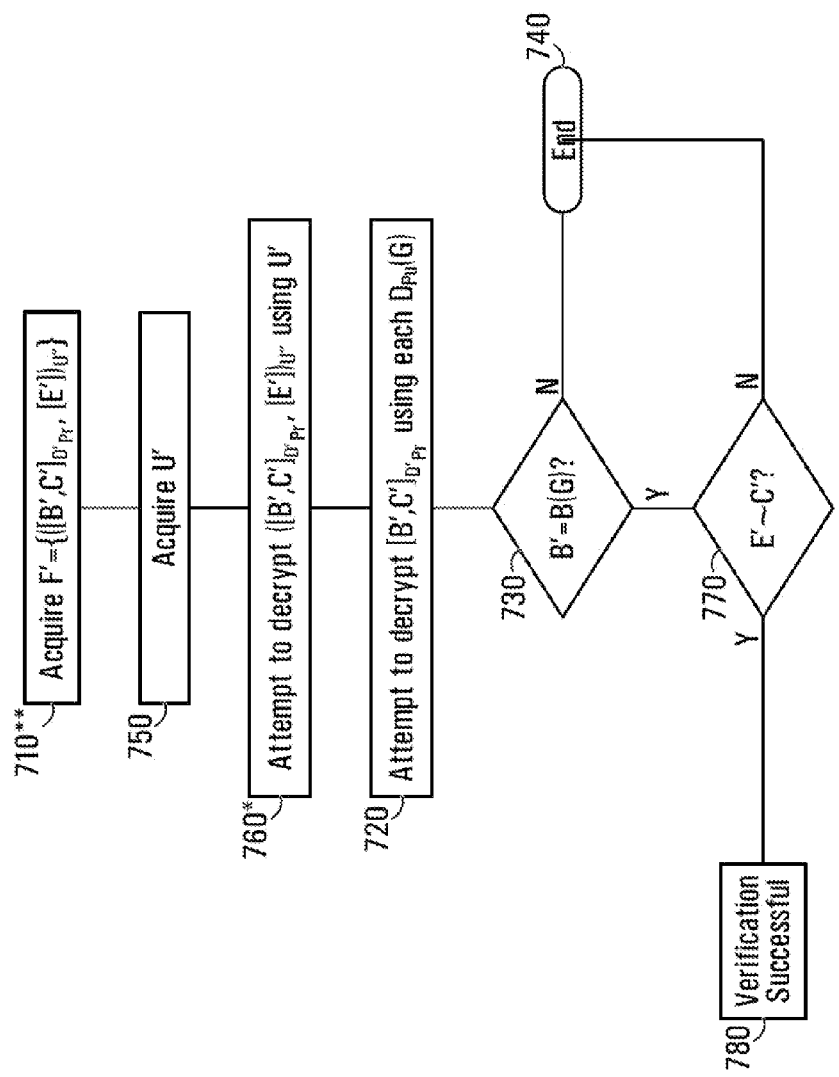
FIG. 7d depicts a method for accessing a resource based on data supplied by a local user, according to a non-limiting embodiment of the present invention.
Figure 7E:
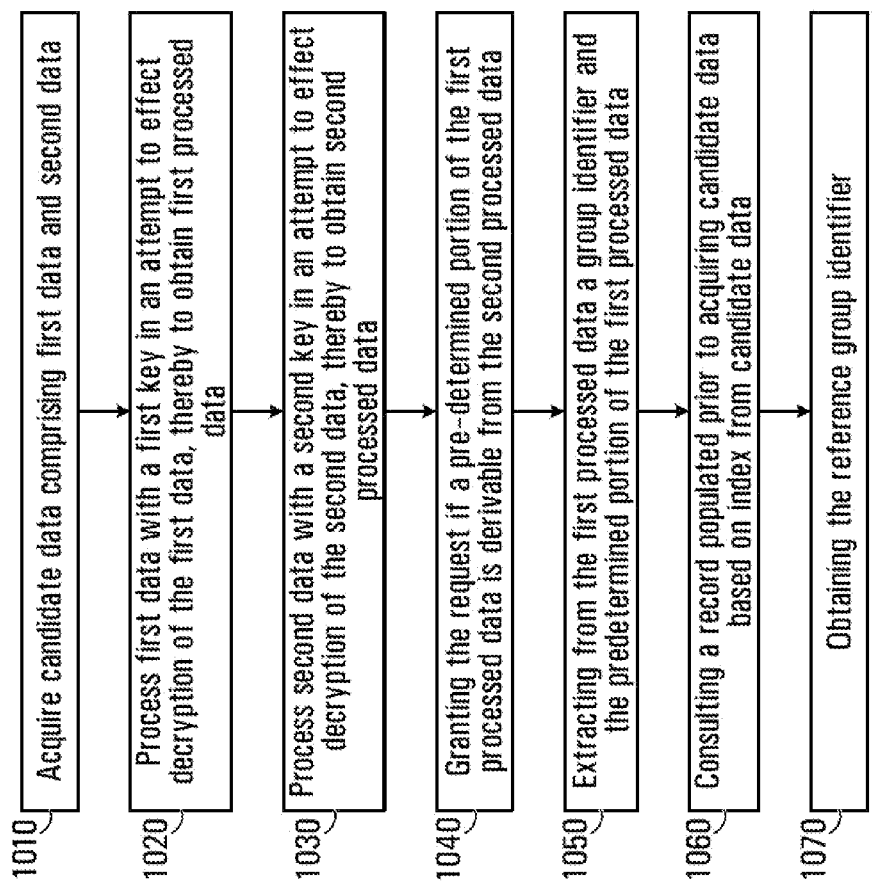
FIG. 7e depicts a method for accessing a resource based on data supplied by a local user and for obtaining a reference group identifier.

The method explained above is represented in the form of a flow chart in FIG. 7e. FIG. 7e shows the step of acquiring candidate data comprising first data and second data is represented by step 1010. The first data can be processed with a first key in an attempt to effect decryption of the first data, thereby to obtain first processed data in step 1020. The second data can be processed with a second key in an attempt to effect decryption of the second data, thereby to obtain second processed data as represented in step 1030. The candidate will be granted the request if a pre-determined portion of the first processed data is derivable from the second processed data as depicted in step 1040. The method may include extracting from the first processed data a group identifier and the predetermined portion of the first processed data as shown in step 1050. The method may include consulting a record populated prior to acquiring candidate data based on an index from candidate data as represented in step 1060. The method may include obtaining the reference group identifier at step 1070.

The second key can be received prior to processing the second data. The method of FIG. 7f shows issuing a query for the second key in step 1022. The second key can be received prior to the processing of the second data as shown in step 1024.

FIG. 7g shows that a hash function is extracted from the candidate data as shown in step 1110. The method include applying the hash function to the second processed data to yield a hash value wherein the pre-determined portion of the first processed data is considered to be derivable from the second processed data when the hash value corresponds to the pre-determined portion of the first processed data. The method includes denying the request if the pre-determined portion of the first processed data is not derivable from the second processed data as generally shown in step 1130.

Figure 7I:
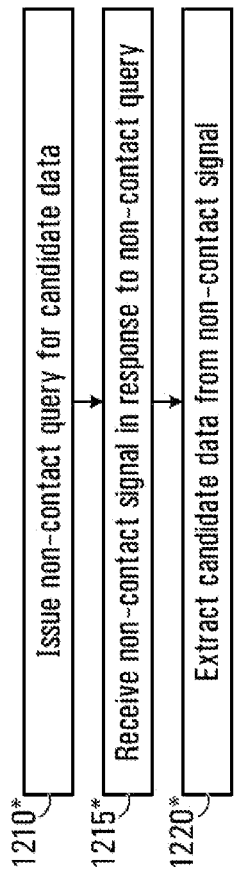
FIG. 7i depicts a method for extracting candidate data
Figure 7J:
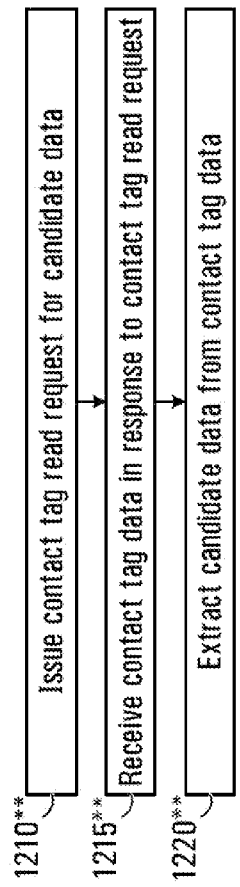
FIG. 7j depicts a method for extracting candidate data

FIGS. 7h, 7i and 7j show methods of acquiring candidate data. FIG. 7h shows that a query is issued for the candidate data (step 1210). The candidate data can be received as shown in step 1220. FIG. 7i shows that a non-contact query is issued for the candidate data (step 1210*). A non-contact signal can be received in response to the non-contact query (step 1215*). The candidate data can be extracted from the non-contact signal (step 1220*). FIG. 7j shows that a contact tag read request is issued for the candidate data (step 1210). Contact tag data can be received in response to the contact tag read request (step 1215**). The candidate data can be extracted from the contact tag data (step 1220****).

Since it is not known whether the candidate data is valid or not, the candidate data can be said to include candidate access data that is denoted F', as well as possibly a candidate key that is denoted U'. When valid, the candidate data may actually represent the access data F(G,A) and the key $U^*(A)$, described above, which would have been previously supplied to candidate user (in this case, the local user 105) via the provisioning phase described with reference to FIGS. 3 and 4. However, at the time the candidate data is supplied by the candidate user, the candidate data has not yet been validated. In other words, at the time the candidate user presents the candidate data to the system in FIG. 1, the candidate user has yet to be verified as a user that has been pre-authorized to access the resource 140. It should be noted that where the candidate user has not been pre-authorized to access the resource 140 (e.g., is not the local user 105), the candidate user may be a malicious user and the candidate data may represent data which is being supplied by the candidate user to attempt to access the resource maliciously. In other cases, the candidate data may be data retrieved from a non-contact tag which is in the proximity of the data input device 110, for example, by a passerby who is carrying a non-contact tag which responds to a read signal transmitted from the data input device 110.

In some embodiments, the candidate user may be in possession of a candidate tag. In some embodiments, the candidate tag may be the tag 118, which in turn comprises the memory 42 storing the candidate access data F' (i.e. the access data F(G,A) stored in the memory 42). In embodiments where the tag 118 comprises a non-contact tag, the method of FIG. 7a is initiated when the tag 118 comes into proximity of the data input device 110, and more specifically the antenna 28. In embodiments where the tag 118 comprises a contact tag, the method of FIG. 7a may be initiated when the tag 118 is placed into contact with the data input device 110, and more specifically with the contact reader 50. In embodiments where the candidate user is in possession of the candidate access data F' but where the candidate access data F' is not stored on a tag, the method depicted in FIG. 7a may be initiated manually by the candidate user interacting with the manual data entry apparatus 29.

At step 710, the candidate access data F' is acquired. In some embodiments, this may be achieved by the data input device 110 interacting with the tag 118 in a manner as described above, while in other embodiments this may be achieved by the candidate user entering in the candidate access data F' into the manual data entry apparatus 29. In any event, if the acquired candidate access data F' is to have any chance of allowing the candidate user to access resource 140, it will need to include the following components: $\{[B',C']_{D'_{Pr}}, [E']_{U''}\}$, where B' is a candidate unique group identifier, C' is a hash of a candidate unique personal identifier, and [B',C'] are encrypted using a candidate key $D'_{Pr}$, while $[E']_{U''}$ is a candidate encrypted unique personal identifier, and U'' is a key used to encrypt E'. In some embodiments, the key U'' may comprise the key U(A). The word "candidate" is used to qualify all the elements of the acquired candidate access data F', since at this point the control module 112 does not know whether the candidate access data F' conforms to the access data F(G,A), that would have been issued by one of the entities in the trust relationship. Indeed, it is one of the goals of the method described in FIG. 7a to discover if the key $D_{PU}(G)$ which may decrypt $[B',C']_{D'_{Pr}}$ is stored in the record 130.

At step 720, the control module 112, attempts to decrypt $[B',C']_{D'_{Pr}}$ using each $D_{PU}(G)$ stored in the record 130, and partitions the results into pre-determined portions to obtain the candidate B' and C' for each corresponding $D_{PU}(G)$.

At step 730, the control module compares each obtained candidate B' to each group identifier B(G) (e.g. a set of reference group identifiers) stored in the record 130. In some embodiments, each obtained candidate B' is compared only to the B(G) corresponding to the $D_{PU}(G)$ used to decrypt $[B',C']_{D'_{Pr}}$. If a match is not found, then the control module 112 terminates further processing of data at step 740. In some embodiments a report may be generated by the data input device 110 of an attempt at an unauthorized access; the report may be accessed by, or transmitted to, one of the entities in the trust relationship, who may then take remedial action. If a match is found, such that B'=B(G), the decryption is determined to be successful, and hence the candidate access data F' has been validated as having been issued by the entity G.

Figure 7K:
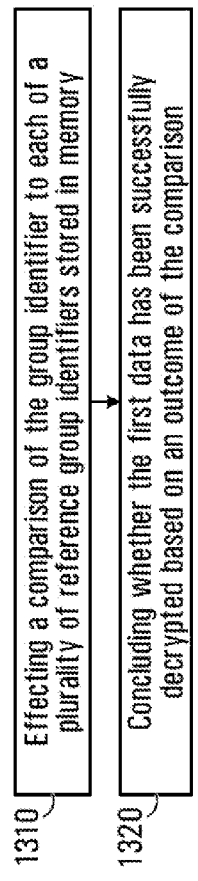
FIG. 7k depicts a method for concluding whether data has been successfully decrypted.

FIG. 7k shows a method for concluding whether the first data has been successfully decrypted. The method includes effecting a comparison of the group identifier to each of a plurality of reference group identifiers stored in memory as shown in step 1310. The method includes concluding whether the first data has been successfully decrypted based on an outcome of the comparison as generally shown in step 1320.

If the decryption from step 730 is successful, the candidate key U' is acquired from the candidate user at step 750, via an interaction of the candidate user with the manual data entry apparatus 29 and/or via the biometric scanner 31. However, in other embodiments, the key U' may be acquired in parallel with acquiring F', or before decryption of F'. In any event, in some embodiments, the candidate key U' is complementary to the key U'', such that the candidate key U' may be used to decrypt data encrypted using the key U''. In embodiments where the key U'' comprises the key U(A), the candidate key may comprise the key U*(A) (i.e. the candidate user is a user, such as the local user 105, who has been pre-authorized to access the resource 140).

At step 760, the control module attempts to decrypt [E']u, using the candidate key U'. To that end, the control module 112 has been provisioned with the decryption algorithm required to decrypt $[E']_{U''}$ using the key U' as an input, to obtain E'.

At step 770, E' is compared to the C' corresponding to the $D_{PU}(G)$ that led to the successful comparison of B'=B(G) at step 730. To perform the comparison, in some embodiments, the control module 112 has been pre-programmed with the hash used to derive C(A) from E(A) during the provisioning phase discussed above. In other embodiments, at the provisioning phase, the hash may be specified within the access data F(G,A), for example appended to [B(G), C(A)] prior to encryption (at step 420 of the method depicted in FIG. 4). In these embodiments, a candidate hash may be extracted from F'. Hence, step 770 may comprise applying the hash (or candidate hash) to E', to obtain an intermediate result C''. In these embodiments, C'' is compared to the C' obtained at step 720. In other embodiments, the control module 112 has been pre-programmed with a reverse hash that may be used to convert C(A) to E(A). Alternatively, the reverse hash may be specified within the access data F(G,A) at the provisioning phase and, in these embodiments, a candidate reverse hash may be extracted from F'. Thus step 770 may comprise applying the reverse hash (or candidate reverse hash) to the C' obtained at step 720, to derive an intermediate result E''. In either embodiment, a comparison is performed either between the intermediate result C'' and the C' obtained at step 720, or between E' and the intermediate result E''. In yet another alternative embodiment, a hash may be applied to C' and a different (or the same) hash applied E', to obtain intermediate results C'' and E'', which may be compared.

If the comparison is not successful, the control module 112 terminates further interaction with the candidate user at step 740. In other words, the requested access to the resource 140 is denied to the candidate user. In these embodiments, the control module 112 may further report an attempt at unauthorized access back to the entity with which the resource 140 is associated.

If, however, the comparison is successful, the verification of the candidate is considered successful at step 780. The control module 112 may then communicate the success of the verification to the access control module 120, which may then transmit a command to the resource 140, indicating that the candidate user is a local user, such as the local user 105, who has been pre-authorized by the entity with which this local user is associated, to access the resource 140. The request made by the candidate user to access the resource 140 may then be granted.

Hence, by:

a. providing the control module 112 with both access to the key $D_{PU}(G)$ for decrypting a pre-determined portion of the access data F(G,A), and the unique group identifier B(G) for verifying successful decryption of the pre-determined portion of the access data F(G,A);

b. providing the local user 105 with the access data F(G,A) and the key U*(A) for decrypting a second portion of the access data F(G,A); and c. embedding a representation of the second portion of the access data F(G,A) in the pre-determined portion of the access data F(G,A);

it is possible to verify that the candidate user is the local user 105, who has been pre-authorized to access the resource 140, by the entity with which the local user 105 is associated, and hence grant the request by the local user 105 to access the resource 140. Further, it is possible to identify the unique group identifier B(G) of the entity with which the local user 105 is associated, and further obtain the unique personal identifier E(A) of the local user 105, without having to locally store a database of unique user identifiers, or access a remote database each time a user interacts with the data input device 110.

In embodiments where the personal identifier E(A) is not encrypted in F(G,A), the candidate access data F' may comprise: $\{[B',C']_{D'Pr}, E'\}$. In these embodiments, steps 750 and 760 may be omitted. Hence, the candidate key U' is not strictly utilized in this embodiment. However, in embodiments where a password or PIN, PASS' (i.e. a candidate password) has been provided in the candidate access data $F'=\{[B',C',PASS']_{D'Pr}, E'\}$, the method depicted in FIG. 7a may include an additional step in which a password or PIN, PASS, is acquired from the candidate user, for example via a keyboard. In these embodiments, the password PASS is compared to the password PASS', and verification is successful if a match occurs, and unsuccessful otherwise. The use of a password or PIN, PASS is not, however, restricted to these embodiments, and may be used in any of the described embodiments.

In embodiments where the access data F(G,A) comprises a random number R, encrypted or otherwise, the candidate access data F' may comprise: $\{[B',C'(R),E']_{DPr(G)}, R\}$, where C'(R) comprises a hash of R. In these embodiments, R is compared to C'(R) in a manner similar to that described previously with respect to E' and C' at step 770. In these embodiments, verification is successful if R (or a hash of R), is similar to C'(R) (or a reverse hash of C'(R)), and unsuccessful otherwise.

In embodiments where the tag 118 comprises a non-contact (e.g., wireless) tag, a further advantage may be achieved. A particular problem that occurs with non-contact tags is that data stored on the tag may be accessible to malicious users operating non-contact (e.g., wireless) tag readers, for example users that have no association with entities in the trust relationship. Hence, a malicious user may extract the data from the non-contact tag simply by transmitting a read signal from their non-contact tag reader to the non-contact tag, which will respond by transmitting the data stored within its memory. Hence, the malicious user may seek patterns in the data through communication with a plurality of non-contact tags. If such patterns can be established, than the malicious entity may be able to construct a non-contact tag that is able to communicate with non-contact tag readers operated by entities in the trust relationship, and further gain unauthorized access to the resource 140.

In embodiments of the present invention, it is assumed that many users will be associated with a particular entity, and hence will all share the unique group identifier B(G). However, by appending the representation C(A) of the unique personal identifier E(A) to the unique group identifier B(G), and further encrypting the result, each non-contact tag will have a different RF signature making patterns in the data more difficult to identify.

FIG. 7b depicts another embodiment of the present invention which is substantially similar to the method depicted in FIG. 7a, with like steps depicted with like numbers. In this embodiment, the record 130 comprises the field 640* as depicted in FIG. 6. Further the candidate access data F' is assumed to have a candidate index I', such that F'= $\{I',[B',C']_{D'Pr}, [E']_{U''}\}$ which is acquired at step 710*, but otherwise is of a similar format to the candidate access data F' described with reference to FIG. 7a. Hence, at step 720*, the candidate index I' is extracted from the candidate access data F', and assumed here to be an index listed in column 640* of record 130. In some embodiments, if no match can be found for I' in column 640* of record 130, further processing of the candidate access data F' will cease. Otherwise, the corresponding $D_{PU}(I')$ is extracted from column 630 of the record 130 and used to attempt to decrypt the candidate access data F' at step 720*. At step 730* a comparison is made between the decrypted obtained B' and the B(I') from column 620, of the record 130, corresponding to the candidate index I'. At this point the method depicted in FIG. 7b continues as the method depicted in FIG. 7a.

FIG. 7c depicts yet another embodiment of the present invention which is substantially similar to the method depicted in FIG. 7a, with like steps depicted with like numbers. In this embodiment, however, the candidate key U' is acquired independent of whether any of the obtained candidate unique user identifiers B' matches a B(G) listed in column 620 of record 130. In other words, no validation of the data occurs until the key U' has been acquired.

FIG. 7d depicts yet another embodiment of the present invention which is substantially similar to the method depicted in FIG. 7a, with like steps depicted with like numbers. However, in this embodiment, it is assumed that the access data F(G,A) was provisioned in the following manner: $F(G,A)=\{[[B(G),C(A)]_{DPr(G)}, [E(A)]]_{U(A)}\}$. In other words the string $[[B(G),C(A)]_{DPr(G)}, [E(A)]]$ is encrypted with the key U(A). Hence, at step 710**, it is assumed that the format of the candidate access data F' is $\{[[B',C']_{D'Pr}, [E']]_{U''}\}$.

Step 750 is then applied to acquire the candidate key U', as described above.

At step 760*, U' is applied to the candidate access data F' to obtain the candidate personal identifier E' and the string $[B', C']_{D'Pr}$.

Step 720 is then applied to attempt to decrypt $[B',C']_{D'Pr}$ using each $D_{PU}(G)$, as described above.

The method then proceeds in the manner previously described. This embodiment illustrates that there are various ways to apply encryption and decryption to the data supplied by the local user 105, using two encryption keys. Indeed, in another embodiment, the access data F(G,A) may be formatted as $\{[[B(G),C(A)], [E(A)]_{U(A)}]_{DPr(G)}\}$.

Once the verification of the local user 105 has occurred, in other words once it has been determined that the candidate user is the local user 105 who has been pre-authorized by an entity in the trust relationship, the local user 105 is given access to the resource 140. In an aspect of the trust relationship, the entity operating the resource 140 may wish to bill the local user 105 for this access, for example in embodiments where the resource 140 comprises a computer network access terminal. However, in embodiments where the local user 105 is not associated with the entity operating the resource 140 (i.e. the local user 105 is associated with a different entity in the trust relationship), the entity operating the resource 140 has no direct method of billing the local user 105. Hence, FIG. 8a depicts a method for billing the local user 105 once it has been verified that the local user has been pre-authorized by an entity in the trust relationship.

Figure 8A:
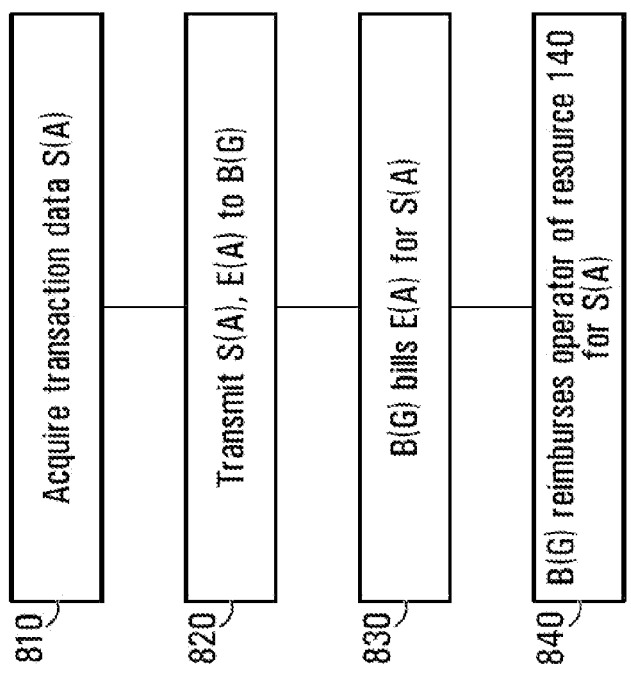
FIG. 8a depicts a method for acquiring and processing transaction data, according to a non-limiting embodiment of the present invention.

The method of FIG. 8a assumes that the unique group identifier B(G) and the unique personal identifier E(A) have been acquired via one of the methods depicted in FIG. 7a, 7b, 7c or 7d. In other words, the method of FIG. 8a assumes that step 780 of either the methods depicted in FIG. 7a, 7b, 7c or 7d has occurred and it has been determined that the data acquired from the local user 105 is no longer candidate data, but data issued by an entity in the trust relationship. For example, the candidate unique personal identifier E' is now known to be the unique personal identifier E(A) associated with the local user 105, and the candidate group identifier B' is now known to be the unique group identifier B(G). This change in nomenclature is reflected in the description of the method of FIG. 8*a*:

At step 810, transaction data S(A) is acquired at the resource 140, or a billing engine (not depicted) in communication with the resource 140. The transaction data S(A) may comprise a record of the fees to be charged to the local user 105, and specifically the fees which are associated with the access to the resource 140 by the local user 105. In embodiments where the local user 105 is associated with an entity other than the entity operating the resource 140, the transaction data S(A) may comprise the amount to be reimbursed to the entity operating the resource 140. For example, in some embodiments, the local user 105 may be charged an access fee for accessing the resource 140, while in other embodiments the local user 105 may be charged a fee for the period of time he/she interacts with the resource 140. In yet other embodiments, the local user 105 may be charged a transaction fee for each service access via the resource 140. In yet other embodiments, for example embodiments where the resource 140 comprises an ATM, the resource 140 may dispense cash, or other items to the local user 105, for which the user is to be charged, or for which the entity operating the resource 140 should be reimbursed.

At step 820, the resource 140 (or the billing engine) transmits the transaction data S(A) to the entity with which the local user 105 is associated, having the unique group identifier B(G), along with the unique personal identifier E(A). In these embodiments, the transaction data S(A) may be stored in the database 330, such that the transaction data S(A) is associated with the unique personal identifier E(A) in the database 330. The transaction data S(A) may then be accessed by the entity with which the local user 105 is associated, for billing the local user 105 (i.e. having the unique personal identifier E(A)). In one embodiment, the transaction data S(A) and the unique personal identifier E(A) are transmitted via the communication network 150. In this embodiment, an address (e.g., an IP address) of the entity associated with the unique group identifier B(G) in the communication network 150 is known to the resource 140. In this embodiment, the address may be stored in the record 130 along with the other data associated with the entity. However, the address may be stored in another record or database that is accessible by the resource 140. In yet other embodiments, the transaction data S(A) may be stored in another local record or database, and transmitted to the entity having the unique group identifier B(G) in the form of a portable record of the transaction data S(A), for example a magnetic disc, a thumb drive, or a paper printout, via mail or courier. In these embodiments, the resource 140 may not necessarily be in communication with the communication network 150.

At step 830, the entity associated with the unique user identifier B(G) bills the local user 105, who is identified via the unique personal identifier E(A), based on the transaction data S(A). In some embodiments, the entity associated with the unique user identifier B(G) bills the local user 105 via a pre-existing account that the local user 105 has established with the entity. In some of these embodiments, the local user 105 may have pre-paid the entity for at least a portion of transaction with the resource 140. In other embodiments, the entity will send a bill to the local user 105.

At step 840 the entity having the unique group identifier B(G) reimburses the entity operating the resource 140 for at least a portion of the transaction represented by the transaction data S(A).

Figure 8B:
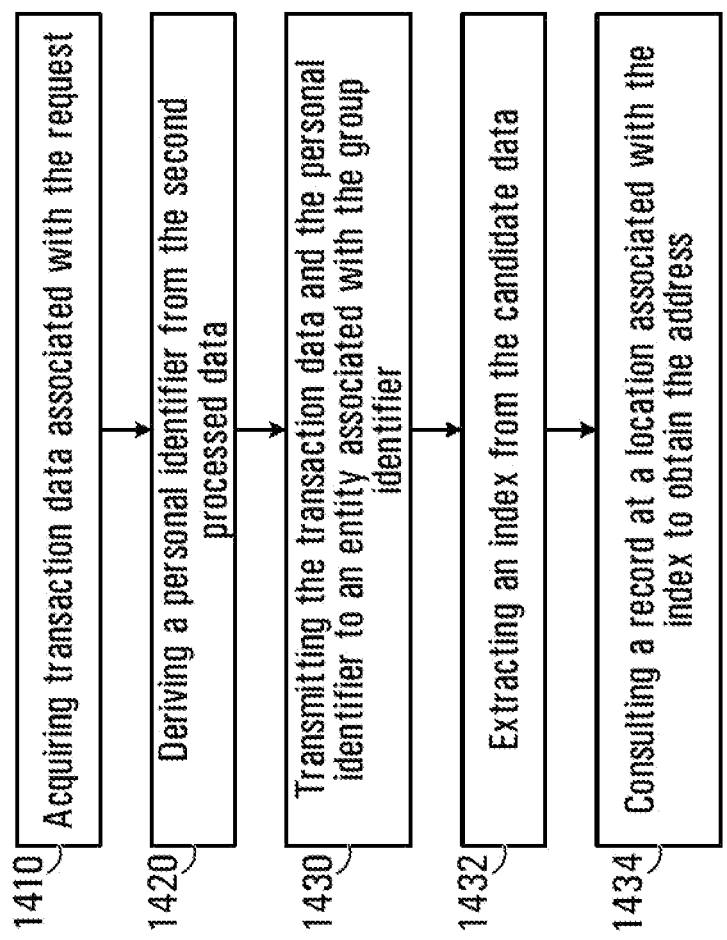
FIG. 8b depicts a method for transmitting transaction data and a personal identifier to an entity associated with the group identifier.

FIG. 8*b* shows a flow chart depicting transmission of transaction data and a personal identifier to an entity associated with the group identifier is shown. The method includes acquiring transaction data associated with the request as shown at step 1410. The method also includes deriving a personal identifier from the second processed data as generally represented at step 1420. The method includes transmitting the transaction data and the personal identifier to an entity associated with the group identifier as shown in step 1430. An index can be extracted from the candidate data (step 1432). The method may include consulting a record at a location associated with the index to obtain the address to which the transmitting is effected as shown in step 1434.

Hence, in these embodiments, an aspect of the trust relationship comprises the entity operating the resource 140 trusting the entity with which the local user 105 is associated to reimburse fees associated with the access to the resource 140 by the local user 105.

In certain embodiments, the access data F(G,A) may further comprise transaction data S(A) For example, the access data F(G,A) may be formatted as $\{[B(G),C(A)]_{DPr(G)}, [E(A)]_{U(A)}, S(A)\}$. In these embodiments, the provisional phase depicted in FIG. 4 will further comprise incorporating transaction data S(A) to the access data F(G,A). In some embodiments, the transaction data S(A) incorporated into the access data F(G,A) during the provisioning process may be supplied the entity with which a user is associated based on data supplied by the user. In a non-limiting example, the transaction data S(A) may represent an amount which the user has pre-paid to entity G for future access to the resource 140. In other embodiments, the transaction data S(A) incorporated into the access data F(G,A) during the provisioning process may be a an empty data field, for saving future transaction data.

Figure 9A:
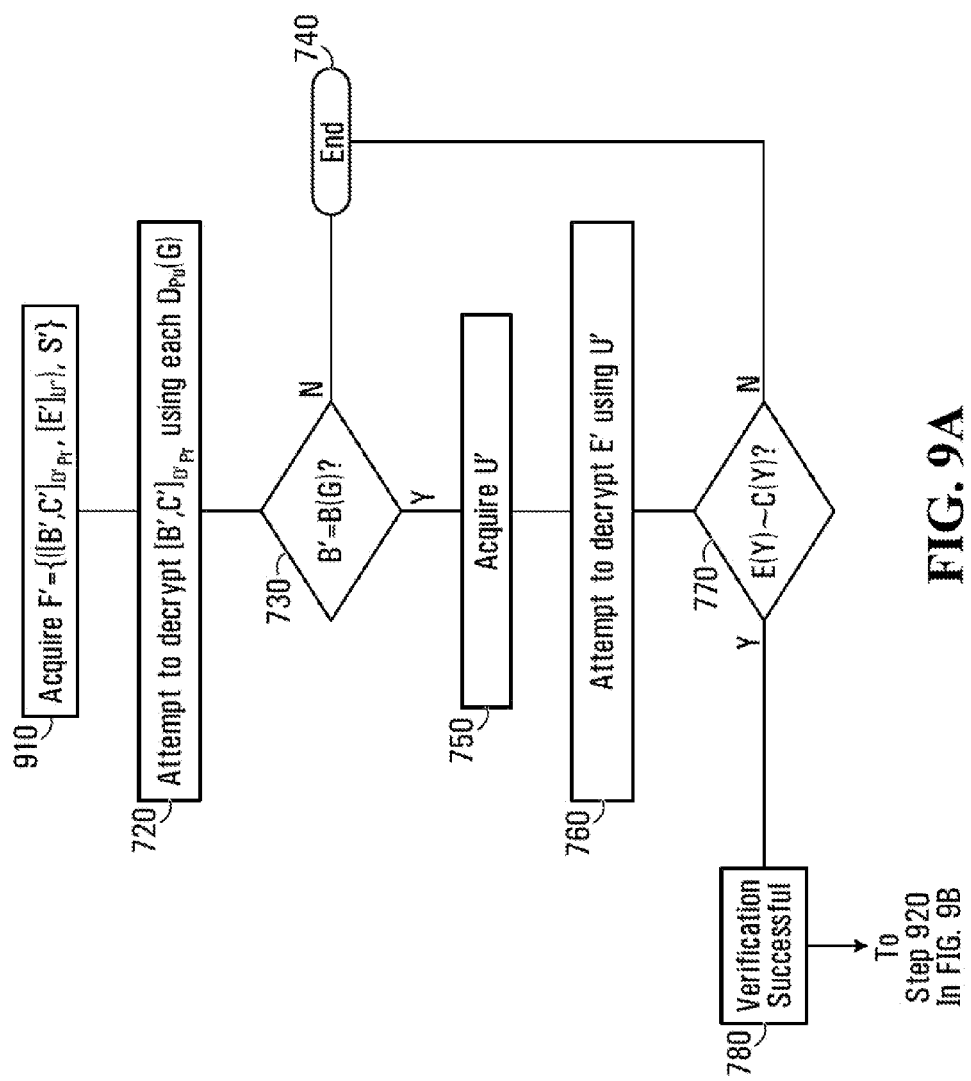
FIGS. 9a and 9b depict a method for accessing a resource based on data supplied by a local user, according to a non-limiting embodiment of the present invention.

Hence, FIG. 9*a* depicts another embodiment of the present invention which is substantially similar to the method depicted in FIG. 7*a*, with like steps depicted with like numbers. However, an assumption is made that the candidate access data F' may further comprise candidate transaction data S'. For example, in embodiments where the candidate access data F' comprises the access data F(G,A), it is assumed that the access data F(G,A) contains transaction data S(A) which, in some embodiments, was incorporated into the access data F(G,A) during the provisioning phase. In other embodiments, the transaction data S(A) may have been incorporated into the access data F(G,A) during a previous interaction with the resource 140, such as the interaction described with reference to FIG. 9*b*. Hence, in this embodiment, at step 910, F' is assumed to contain a field representing the candidate transaction data S'. Otherwise the method depicted in FIG. 9*a* proceeds in manner similar to FIG. 7*a*.

Once it has been verified that the candidate user is the local user 105, pre-authorized to access the resource 140 at step 780, the local user 105 proceeds to access the resource 140. However, as it has been verified that the local user 105 has been pre-authorized to access the resource 140, the data acquired from the local user 105 is no longer candidate to be data issued by an entity in the trust relationship. For example, the candidate access data F' is now known to be the access data F(G,A) associated with the local user 105. Similarly, the candidate transaction data S' is now known to be transaction data S(A) associated with the local user 105. This change in nomenclature is reflected in the description of the method of FIG. 9b, and at step 915.

Figure 9B:
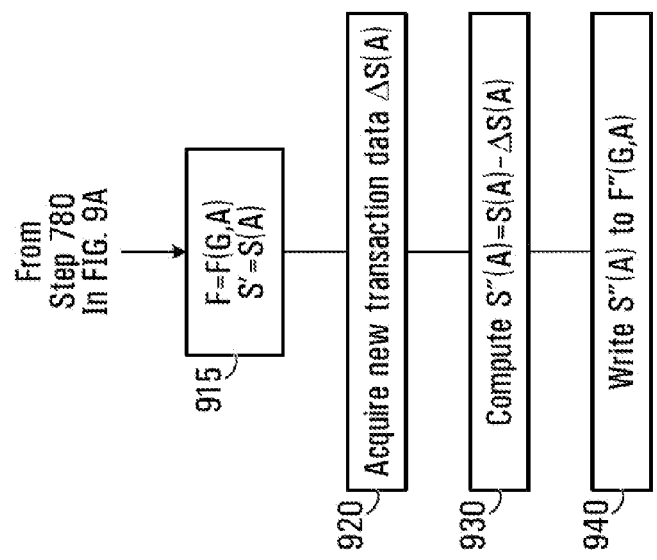

At step 920, as depicted in FIG. 9b, new transaction data ΔS(A) is acquired by the resource 140 (or the associated billing engine), the new transaction data ΔS(A) being associated with an access to the resource 140 by the local user 105. The new transaction data ΔS(A) may represent the fees associated with the interaction between the local user 105 and the resource 140, such as cash withdrawals etc. In some embodiments, the resource 140 may store a running tally of the fees associated with an access to the resource 140 by the local user 105. In these embodiments, the local user 105 may be denied further access to the resource 140 if the new transaction data ΔS(A) becomes equal to the transaction data S(A) extracted from the access data F(G,A) (formerly the candidate transaction data). In embodiments where the resource 140 comprises an ATM, if the local user 105 attempts to withdraw more cash from the ATM than is recorded in the transaction data S(A), he/she may be denied the cash withdrawal.

In any event, at step 930, the resource 140 (or the billing engine) compiles updated transaction data S"(A)=S(A)−ΔS(A), which in one non-limiting embodiment represents the difference between the transaction data S(A) recorded in the access data F'(G,A) when the local user 105 begins to access the resource 140, for example a pre-paid amount, and the fees incurred by the local user in accessing the resource 140.

At step 940, the data input device 110 appends the updated transaction data S"(A) to the access data F(G,A), replacing the transaction data S(A) originally acquired. In some embodiments, the access data F(G,A) then reflects the remaining credit available to the local user 105, in the form of the updated transaction data S"(A). In embodiments where the access data F(G,A) is stored on the tag 118, the data entry module 115 may transmit a write signal, via the antenna 28 in embodiments where the tag 118 is a non-contact (e.g., wireless) tag, or the contact reader 50 in embodiments where the tag 118 is a contact tag, the write signal conveying the updated transaction data S"(A). In some embodiments, the write signal further includes instructions to replace S(A) with S"(A), the instructions being for processing by the tag 118. In other embodiments, the control module 112 may store the access data F(G,A) acquired at step 910, here understood to be, for example, $\{[B(G),C(A)]_{DPr(G)}, [E(A)]_{U(A)}, S(A)\}$, and use this data as the basis for generating a new data set F"(G,A) which includes the updated transaction data S"(A) in place of the original data set S(A), for example: F"(G,A)=$\{[B(G), C(A)]_{DPr(G)}, [E(A)]_{U(A)}, S"(A)\}$. In embodiments which include the tag 118, the new data set F"(G,A) is transmitted to the tag 118 via a write signal, as above, the new data set for overwriting the access data F(G,A) stored in the memory 42.

Figure 9C:
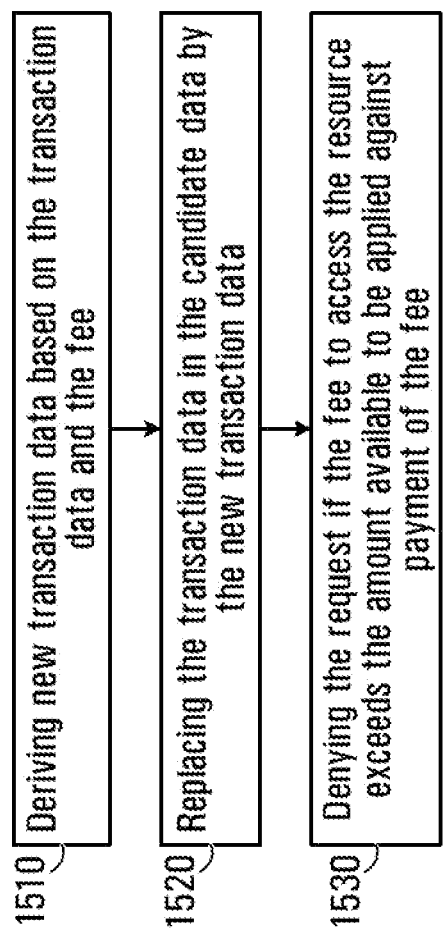
FIG. 9c depicts a method for granting access to a resource wherein the access is associated with a fee.

FIG. 9c shows a general method wherein a candidate is granted or denied the request, the access being associated with a fee. New transaction data can be derived based on the transaction data and the fee at step 1510. The method includes replacing the transaction data in the candidate data by the new transaction data as shown in step 1520. The method includes denying the request if the fee to access the resource exceeds the amount available to be applied against payment of the fee as shown in step 1530.

In some embodiments the updated transaction day S"(A) and/or the new transaction data ΔS(A) and or the transaction data S(A) may be transmitted to the data base 330 via, for example, the computing network 150. In these embodiments, the S"(A), ΔS(A) and/or S(A) may be stored in the database 330, such that it associated the unique user identifier A in the database 330.

In some embodiments, the transaction data S(A) incorporated into the access data F(G,A) may be encrypted, for example using the key U(A). In these embodiments, non-limiting formats for the access data F(G,A) may include $\{[B(G),C(A)]_{DPr(G)}, [E(A),S(A)]_{U(A)}\}$ and $\{[B(G),C(A)]_{DPr(G)}, [E(A)]_{U(A)}, [S(A)]_{U(A)}\}$. Hence, in the method depicted in FIGS. 9a and 9b, S' is determined by applying U*(A) to the decryption of [S']u or [E',S']$_{U'''}$. This determination of S' can occur at any step in the method depicted in FIGS. 9a and 9b, prior to step 930. In these embodiments, at step 940, the updated transaction data S"(A) may be encrypted prior to writing S"(A) to F"(G,A). In embodiments where the key U(A) and the key U*(A) are symmetric (i.e. the same alphanumeric string), the key U*(A) acquired at step 750 may be used to encrypt S"(A) (or [E(A), S"(A)]) prior to generating the new data set F"(G,A).

In embodiments where the key U(A) and the key U*(A) are asymmetric, the key U(A) is acquired prior to encrypting S"(A). In these embodiments, the key U(A) may be incorporated into the access data F(G,A), during the provisioning phase, as discussed above. In various non-limiting embodiments F(G,A) may have the format $\{[B(G),C(A), U(A)]_{DPr(G)}, [E(A)]_{U(A)}, [S(A)]_{U(A)}\}$, or $\{[B(G), C(A)]_{DPr(G)}, [E(A),U(A)]_{U(A)}, [S(A)]_{U(A)}\}$, $\{[B(G), C(A)]_{DPr(G)}, [E(A)]_{U(A)}, [S(A),U(A)]_{U(A)}\}$. Other embodiments for incorporating the key U(A) into the access data F(G,A) are within the scope of the present invention. Hence, the key U(A) will be acquired when the key $D_{PU}(G)$ or the key U*(A) is applied to decrypting F'(G,A).

Whether the key U(A) is part of a symmetric or an asymmetric key pair, in these embodiments, the control module 112 is pre-programmed with the encryption algorithm for encrypting data using the key U(A) as an input.

Figure 10:
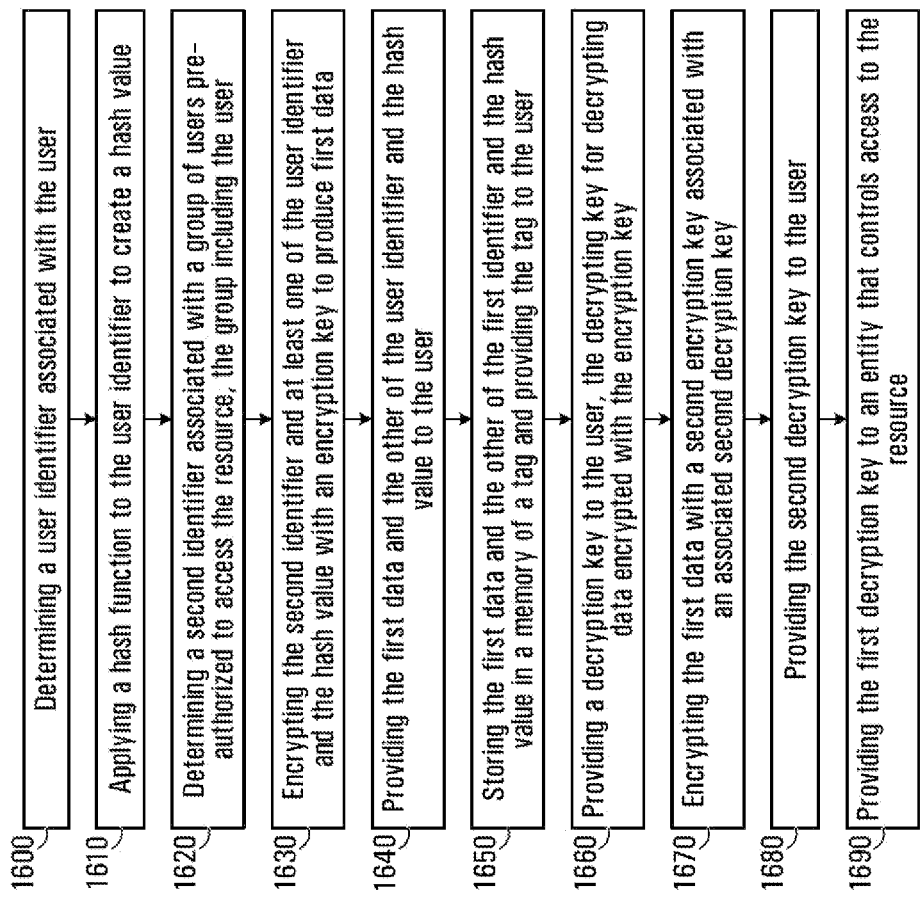
FIG. 10 depicts a method for pre-authorizing a user to access a resource.

FIG. 10 shows a flow-chart depicting a method for pre-authorizing a user to access a resource. The method includes determining a user identifier associated with the user as shown in step 1600. The method also includes applying a hash function to the user identifier to create a hash value as depicted in step 1610. The method also include determining a second identifier associated with a group of users pre-authorized to access the resource wherein the group includes the user as shown in step 1620. The method may include encrypting the second identifier and at least one of the user identifier and the hash value with an encryption key to produce first data (step 1630). The method may include providing the first data and the other of the user identifier and the hash value to the user as depicted in step 1640. The method may include storing the first data and the other of the first identifier and the hash value in a memory of a tag and providing the tag to the user as generally shown in step 1650. A decryption key can be provided to the user, wherein the decrypting key is used for decrypting data encrypted with the encryption key (step 1660). The first data can be encrypted with a second encryption key associated with an associated second decryption key as shown in step 1670. The second decryption key can be provided to the user as shown in step 1680. The method may include step 1690 wherein the first decryption key is provided to an entity that controls access to the resource.

It will be appreciated that the expressions "reader", "tag", and RFID have been employed generally to refer to technology based on interrogation and response, without limitation to any particular standard, mode of operation, and, in the case of RFID, frequency range. Also in the case of RFID, the term has been used without limitation to any particular wireless mode of operation, for example near-field or far-field, active or passive etc. While the present invention envisions that readers and tag may be standards compliant, such compliance is not required for the operation, understanding or implementation of the present invention.

Those skilled in the art will appreciate that in some embodiments, functionality of various elements described herein (e.g., the control module 112, the host computer 320, and the microchip 40) may be implemented using pre-programmed hardware or firmware elements (e.g., application specific integrated circuits (ASICs), electrically erasable programmable read-only memories (EEPROMs), etc.), or other related components. In other embodiments, functionality various elements described herein (e.g., the control module 112, the host computer 320, and the microchip 40) may be achieved using a computing apparatus that has access to a code memory (not shown) which stores computer-readable program code for operation of the computing apparatus. The computer-readable program code may be stored on a medium which is fixed, tangible and readable directly by these components, (e.g., removable diskette, CD-ROM, ROM, fixed disk, USB drive), or the computer-readable program code may be stored remotely but transmittable to these elements via a modem or other interface device connected to a network (including, without limitation, the Internet) over a transmission medium. The transmission medium may be either a non-wireless medium (e.g., optical or analog communications lines) or a wireless medium (e.g., microwave, infrared, free-space optical or other transmission schemes) or a combination thereof.

Persons skilled in the art will appreciate that there are yet more alternative implementations and modifications possible for implementing the present invention, and that the above implementations and examples are only illustrations of embodiments of the present invention. The scope of the invention, therefore, is only to be limited by the claims appended hereto.

The invention claimed is:

1. A method, comprising:
   acquiring candidate data in association with a request for accessing a resource, said candidate data comprising first data and second data, said second data being different from said first data;
   processing said first data with a first key in an attempt to effect decryption of said first data, thereby to obtain first processed data;
   processing the second data with a second key different from said first key in an attempt to effect decryption of said second data, thereby to obtain second processed data;
   applying a hash function to said second processed data to yield a hash value;
   granting said request if said hash value matches a pre-determined portion of said first processed data.

2. The method of claim 1, wherein said first data and said second data are separate portions of said candidate data.

3. The method of claim 1, wherein said first data is contained within said second data.

4. The method of claim 1, wherein said second data is contained within said first data.

5. The method of claim 1, further comprising extracting from said first processed data a group identifier and said pre-determined portion of said first processed data.

6. The method of claim 5, further comprising effecting a comparison of said group identifier to a reference group identifier and concluding whether said first data has been successfully decrypted based on an outcome of said comparison.

7. The method of claim 6, wherein said first data is considered to have been successfully decrypted if said group identifier matches said reference group identifier, and wherein said first data is considered to have been unsuccessfully decrypted if said group identifier does not correspond to said reference group identifier.

8. The method of claim 7, further comprising obtaining said reference group identifier by consulting a record populated prior to said acquiring.

9. The method of claim 8, wherein said candidate data further comprises an index, said method further comprising consulting said record based on said index to obtain said reference group identifier.

10. The method of claim 5, further comprising effecting a comparison of said group identifier to each of a plurality of reference group identifiers stored in memory, and concluding whether said first data has been successfully decrypted based on an outcome of said comparison.

11. The method of claim 6, further comprising receiving said second key prior to processing said second data.

12. The method of claim 11, wherein said second key is received from a user via a keypad.

13. The method of claim 11, further comprising issuing a query for said second key, wherein said second key is received in response to issuance of said query.

14. The method of claim 13, wherein said issuing said query is performed only if said first data has been successfully decrypted.

15. The method of claim 5, further comprising acquiring transaction data associated with said request.

16. The method of claim 15, further comprising:
    deriving a personal identifier from the second processed data; and
    transmitting said transaction data and said personal identifier to an entity associated with said group identifier.

17. The method of claim 16, wherein said transmitting is effected via a communication network to an address associated with said entity, said method further comprising extracting an index from said candidate data, and consulting a record at a location associated with said index to obtain said address.

18. The method of claim 17, wherein said communication network comprises the internet, and said address is an internet address.

19. The method of claim 1, wherein said second processed data has a greater number of bits than said pre-determined portion of said first processed data.

20. The method of claim 1, wherein the hash function is pre-determined.

21. The method of claim 1, further comprising extracting the hash function from the candidate data.

22. The method of claim 1, further comprising denying said request if said hash value does not correspond to said pre-determined portion of said first processed data.

23. The method of claim 1, wherein when said hash value matches said pre-determined portion of said first processed data, said second processed data conveys a personal identifier associated with a user pre-authorized to access said resource.

24. The method of claim 23, wherein said first key is a first decryption key, and said first data is encrypted by an entity using a first encryption key associated with said first decryption key.

25. The method of claim 24, wherein the user is pre-authorized to access said resource by said entity.

26. The method of claim 25, said entity being a first entity, wherein said granting is performed by a second entity and wherein said first entity is in a trust relationship with said second entity.

27. The method of claim 24, wherein said second key comprises a second decryption key, and said second data is encrypted using a second encryption key associated with said second decryption key.

28. The method of claim 27, said first encryption key and said first decryption key are asymmetric.

29. The method of claim 28, said second encryption key and said second decryption key are identical.

30. The method of claim 27, wherein said first data comprises said second encryption key.

31. The method of claim 1, wherein when said hash value matches said pre-determined portion of said first processed data, said second processed data conveys biometric data associated with a user pre-authorized to access said resource.

32. The method of claim 31, wherein said biometric data is indicative of at least one of a fingerprint scan, a skin scan and an iris scan.

33. The method of claim 1, wherein access to said resource is associated with a fee; and wherein said candidate data further comprises transaction data representative of an amount available to be applied against payment of said fee.

34. The method of claim 33, further comprising denying said request if said fee exceeds said amount.

35. The method of claim 34, further comprising deriving new transaction data based on said transaction data and said fee, and replacing said transaction data in said candidate data by said new transaction data.

36. The method of claim 1, further comprising issuing a query, wherein said acquiring candidate data occurs in response to issuing said query.

37. The method of claim 36, wherein said query comprises a non-contact query, said receiving candidate data comprising receiving a non-contact signal in response to said non-contact query and extracting said candidate data from said non-contact signal.

38. The method of claim 37, wherein said non-contact query comprises an RFID read request, and said non-contact signal comprises an RFID signal.

39. The method of claim 36, wherein said query comprises a contact tag read request, said receiving candidate data comprising receiving contact tag data in response to said contact tag read request, and extracting said candidate data from said contact tag data.

40. The method of claim 39, wherein said contact tag read request comprises a magnetic swipe card read request.

41. The method of claim 39, wherein said contact tag read request comprises a smart card read request.

42. The method of claim 1, wherein said resource comprises at least one of, an automated teller machine, a component of an automated teller machine, a computer, a terminal for accessing a communication network, a point of sale terminal, and a physical access point.

43. A non-transitory computer-readable medium comprising computer-readable program code which, when interpreted by a computing apparatus, causes the computing apparatus to execute a method, the computer-readable program code comprising:

first computer-readable program code for causing the computing apparatus to acquire candidate data in association with a request for accessing a resource, said candidate data comprising first and second data, said second data being different from said first data;

second computer-readable program code for causing the computing apparatus to process said first data with a first key in an attempt to effect decryption of said first data, thereby to obtain first processed data;

third computer-readable program code for causing the computing apparatus to process the second data with a second key different from said first key in an attempt to effect decryption of said second data, thereby to obtain second processed data;

fourth computer-readable program code for causing the computing apparatus to apply a hash function to said second processed data to yield a hash value; and fifth computer-readable program code for causing the computing apparatus to grant said request if said hash value matches said pre-determined portion of said first processed data.

44. A method comprising:

receiving a request for accessing a resource, said request comprising first data and second data, said second data being different from said first data;

processing said first data with a key in an attempt to effect decryption of said first data, thereby to obtain processed data;

applying a hash function to said second data to yield a hash value;

granting said request if said hash value matches said pre-determined portion of said processed data.

45. The method of claim 44, wherein said first data and said second data are separate portions of candidate data acquired in association with said request.

46. The method of claim 44, wherein said first data is contained within said second data.

47. The method of claim 44, wherein said second data is contained within said first data.

48. The method of claim 44, further comprising extracting from said processed data a group identifier and said pre-determined portion of said first processed data.

49. The method of claim 48, further comprising effecting a comparison of said group identifier to a reference group identifier and concluding whether said first data has been successfully decrypted based on an outcome of said comparison.

50. The method of claim 49, wherein said first data is considered to have been successfully decrypted if said group identifier matches said reference group identifier, and wherein said first data is considered to have been unsuccessfully decrypted if said group identifier does not correspond to said reference group identifier.

51. The method of claim 50, further comprising obtaining said reference group identifier by consulting a record populated prior to said acquiring.

52. The method of claim 51, wherein said request further comprises an index, said method further comprising consulting said record based on said index to obtain said reference group identifier.

53. The method of claim 48, further comprising effecting a comparison of said group identifier to each of a plurality of reference group identifiers stored in memory, and concluding whether said first data has been successfully decrypted based on an outcome of said comparison.

54. The method of claim 44, wherein said second data has a greater number of bits than said pre-determined portion of said first processed data.

55. The method of claim 44, wherein the hash function is pre-determined.

56. The method of claim 44, further comprising extracting the hash function from candidate data acquired in association with said request.

57. The method of claim 44, further comprising denying said request if said hash value does not correspond to said pre-determined portion of said first processed data.

58. The method of claim 44, wherein when said hash value matches said pre-determined portion of said first processed data, said second data conveys a personal identifier associated with a user pre-authorized to access said resource.

59. The method of claim 58, wherein said key is a first decryption key, and said first data is encrypted by an entity using a first encryption key associated with said first decryption key.

60. The method of claim 59, wherein the user is pre-authorized to access said resource by said entity.

61. The method of claim 60, said entity being a first entity, wherein said granting is performed by a second entity and wherein said first entity is in a trust relationship with said second entity.

62. The method of claim 44, wherein said resource comprises at least one of, an automated teller machine, a component of an automated teller machine, a computer, a terminal for accessing a communication network, a point of sale terminal, and a physical access point.

63. The method of claim 45, wherein access to said resource is associated with a fee; and wherein said candidate data is stored on a medium and further comprises transaction data, said transaction data representative of an amount available to be applied against payment of said fee.

64. The method of claim 63, further comprising denying said request if said fee exceeds said amount.

65. The method of claim 64, further comprising deriving new transaction data based on said transaction data and said fee, and storing said transaction data on said medium.

66. The method of claim 65, wherein storing said new transaction data on said medium comprises replacing said transaction data with said new transaction data.

67. A method of pre-authorizing a user to access a resource, comprising:
determining a user identifier associated with the user;
applying a hash function to said user identifier to create a hash value;
determining a second identifier associated with a group of users pre-authorized to access the resource, said group including said user;
encrypting the second identifier and one of (i) the user identifier and (ii) the hash value with an encryption key to produce first data;
providing said first data and the other of (i) the user identifier and (ii) the hash value to said user.

68. The method of claim 67, wherein said providing comprises sending a message to said user, said message comprising said first data and the other of the first identifier and the hash value.

69. The method of claim 67, further comprising storing said first data and the other of the first identifier and the hash value in a memory of a tag and providing said tag to said user.

70. The method of claim 67, further comprising providing a decryption key to said user, said decryption key for decrypting data encrypted with said encryption key.

71. The method of claim 67, wherein said first data is provided in encrypted form.

72. The method of claim 71, wherein said encryption key is a first encryption key associated with a first decryption key, and wherein said encrypted form is generated as a result of encrypting said first data with a second encryption key associated with an associated second decryption key.

73. The method of claim 72, further comprising providing said second decryption key to said user.

74. The method of claim 73, further comprising providing said first decryption key to an entity that controls access to said resource.

75. The method of claim 74, wherein a priori knowledge of (I) the first decryption key and (II) the second identifier, allows said entity, when provided with (I) the first data and the other of the user identifier and the hash value and (II) the second decryption key, to confirm that the user has been pre-authorized to access the resource.

76. A tag, comprising: a memory storing an encrypted version of first data and an encrypted version of second data, said second data being different from said first data, said first data capable of being retrieved by decryption using a first key received from a first entity thereby to obtain first processed data, said second data capable of being retrieved by decryption using a second key different from said first key received from a user of the tag thereby to obtain second processed data, wherein a hash function applied to said second processed data yields a hash value which matches a predetermined portion of said first processed data when the user is pre-authorized by the first entity to access a resource associated with a second entity having a trust relationship with the first entity.

77. The tag of claim 76, further comprising an interface for conveying said encrypted version of said first data and said encrypted version of said second data to a reader.

78. The tag of claim 77, wherein said interface comprises an antenna and a transponder operative to send a signal through said antenna, the signal being representative of said encrypted version of said first data and said encrypted version of said second data stored in said memory.

79. The tag of claim 78, wherein said transponder is operative to send the signal in response to the receipt of a query signal through said antenna.

80. The tag of claim 78, wherein said memory comprises an RFID memory, said antenna comprises an RFID antenna, and said transponder comprises an RFID transponder.

81. The tag of claim 77, wherein said memory comprises a smart card memory, and said interface comprises a smart card communication interface.

82. The tag of claim 76, wherein said memory comprises a magnetic strip.

* * * * *